US010341313B2

(12) United States Patent
Kojima et al.

(10) Patent No.: US 10,341,313 B2
(45) Date of Patent: Jul. 2, 2019

(54) PERIPHERAL DEVICE, WIRELESS COMMUNICATION CHIP, COMPUTER-READABLE NON-TRANSITORY STORAGE MEDIUM HAVING APPLICATION PROGRAM STORED THEREIN, INFORMATION PROCESSING SYSTEM, AND INFORMATION PROCESSING METHOD

(71) Applicant: NINTENDO CO., LTD., Kyoto (JP)

(72) Inventors: Yohei Kojima, Kyoto (JP); Ryoji Kuroda, Kyoto (JP); Tatsuhiro Shirai, Kyoto (JP); Jumpei Wada, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 348 days.

(21) Appl. No.: 15/204,170

(22) Filed: Jul. 7, 2016

(65) Prior Publication Data
US 2017/0099273 A1    Apr. 6, 2017

(30) Foreign Application Priority Data
Oct. 5, 2015  (JP) .................. 2015-197851

(51) Int. Cl.
H04L 29/06    (2006.01)
H04L 9/32     (2006.01)
(Continued)

(52) U.S. Cl.
CPC .......... H04L 63/061 (2013.01); H04L 9/3247 (2013.01); H04L 63/0823 (2013.01);
(Continued)

(58) Field of Classification Search
CPC .................................................. H04L 63/061
(Continued)

(56) References Cited

U.S. PATENT DOCUMENTS

2007/0190977 A1    8/2007   Fok et al.
2010/0070760 A1    3/2010   Vanderveen et al.
(Continued)

FOREIGN PATENT DOCUMENTS

JP        2012-502587        1/2012

OTHER PUBLICATIONS

Partial European search report dated Feb. 10, 2017 for the European Patent Application No. 16178124.0 (corresponding to U.S. Appl. No. 15/204,170) (7 pgs.).

(Continued)

Primary Examiner — Peter C Shaw
(74) Attorney, Agent, or Firm — Nixon & Vanderhye P.C.

(57) ABSTRACT

This first communication section transmits, to an authentication server, an encryption key, identification information capable of uniquely identifying a peripheral device, and signature information of the identification information. A second communication section receives data based on an authentication process performed in the authentication server on the basis of the identification information and the signature information transmitted by the first communication section, then, encrypts second data transmission request information, and transmits the encrypted request information to the authentication server. A third communication section receives second data which is encrypted and transmitted from the authentication server in response to the request information transmitted by the second communication section, then decrypts the second data, and transmits the decrypted second data to the authentication server. A communication process execution section receives third data based on a result indicating that authenticity of the second data transmitted by the third communication section has been confirmed in the authentication server, and then, per- (Continued)

forms encrypted communication with the predetermined communication device.

5 Claims, 23 Drawing Sheets

(51) Int. Cl.
*H04W 12/04* (2009.01)
*H04W 12/06* (2009.01)

(52) U.S. Cl.
CPC ......... *H04L 63/0853* (2013.01); *H04W 12/04* (2013.01); *H04W 12/06* (2013.01)

(58) Field of Classification Search
USPC ........................................................ 713/156
See application file for complete search history.

(56) References Cited

U.S. PATENT DOCUMENTS

| | | | |
|---|---|---|---|
| 2013/0232336 A1* | 9/2013 | Cheung | H04L 9/006 713/156 |
| 2014/0223174 A1 | 8/2014 | Krishnamurthy | |
| 2015/0161061 A1* | 6/2015 | Couch | G06F 13/12 710/3 |
| 2015/0172739 A1* | 6/2015 | Shaw | H04N 21/25816 725/31 |
| 2015/0222517 A1 | 8/2015 | McLaughlin et al. | |
| 2015/0235042 A1 | 8/2015 | Salehpour et al. | |
| 2016/0182499 A1* | 6/2016 | Sharaga | H04L 63/0853 713/156 |

OTHER PUBLICATIONS

"iOS Security", Oct. 1, 2014, XP055145007, Retrieved from the Internet: URL: http://images.apple.com/privacy/docs/iOS_Security_Guide_Oct_2014 (50 pgs.).

European search report dated May 18, 2017 for the European Patent Application No. 16178124.0 (corresponding to U.S. Appl. No. 15/204,170) (17 pgs.).

"iOS Security", Oct. 1, 2014, URL:http://images.apple.com/privacy/docs/iOS_Security_Guide_Oct_2014.pdf, (50 pgs.).

https://www.nintendo.co.uk/Games/Nintendo-DS/Learn-With-Pokemon-Typing-Adventure-523578.html, 4 pages, downloaded from Google cache Jul. 7, 2016.

* cited by examiner

| BT_Addr | USER ID | PWD |
|---|---|---|
| 12345678 | ABC | 9999 |
| 45678912 | DEF | 8888 |
| 78912345 | GHI | 7777 |
| ⋮ | ⋮ | ⋮ |

PERIPHERAL DEVICE, WIRELESS
COMMUNICATION CHIP,
COMPUTER-READABLE NON-TRANSITORY
STORAGE MEDIUM HAVING APPLICATION
PROGRAM STORED THEREIN,
INFORMATION PROCESSING SYSTEM,
AND INFORMATION PROCESSING
METHOD

CROSS REFERENCE TO RELATED
APPLICATION

The disclosure of Japanese Patent Application No. 2015-197851, filed on Oct. 5, 2015, is incorporated herein by reference.

FIELD

The exemplary embodiments disclosed herein relate to a peripheral device communicable with a communication device such as a smart device, for example, and more specifically, relate to an authentication process for a peripheral device.

BACKGROUND AND SUMMARY

Conventionally, peripheral devices that can each be connected to an information processing device such as a smartphone via an contactless interface such as Bluetooth (registered trademark) are known. In the Bluetooth standard, profiles that define protocols for respective types of devices have been established. If devices that are to communicate with each other have the same profile, communication using the function of the profile is allowed. For example, when the peripheral device is a keyboard, if both the peripheral device and the information processing device have a profile called HID (Human Interface Device Profile), connection can be established between the devices, which enables text entry and the like to the information processing device by use of the keyboard. For example, when the peripheral device is a headphone, if both the peripheral device and the information processing device have a profile called A2DP (Advanced Audio Distribution Profile), connection can be established between them, whereby sound can be transmitted from the information processing device to the headphone.

Meanwhile, in conventional technologies, when a peripheral device using Bluetooth described above is to be used at an information processing device, authentication of the peripheral device is not performed. That is, as long as a peripheral device has a profile as described above, any peripheral device can be connected to and used at an information processing device.

Therefore, an object of the present disclosure is to provide a system and the like that can authenticate a peripheral device as described above when the peripheral device is to be used at an information processing device.

In order to attain the above object, the following configuration examples can be conceived, for example.

One example of a configuration example is a peripheral device capable of performing data communication with a predetermined communication device, and the peripheral device includes a first communication section, a second communication section, a third communication section, and a communication process execution section. The first communication section is configured to transmit, to an authentication server, an encryption key for encrypted communication, identification information which is information capable of uniquely identifying the peripheral device, and signature information which is a digital signature of the identification information. The second communication section is configured to receive, from the authentication server, first data which is data based on a result of an authentication process executed in the authentication server on the basis of the identification information and the signature information transmitted by the first communication section, then, to encrypt, with the encryption key, request information indicating a transmission request for second data, and to transmit the encrypted request information to the authentication server. The third communication section is configured to receive the second data encrypted and transmitted from the authentication server in response to the request information transmitted by the second communication section, then, to decrypt the encrypted second data by use of the encryption key, and to transmit the decrypted second data to the authentication server. The communication process execution section is configured to receive, from the authentication server, third data which is data based on a result indicating that authenticity of the second data transmitted by the third communication section has been confirmed in the authentication server, and then to execute a communication process using fourth data encrypted with the encryption key, between the peripheral device and the predetermined communication device.

According to the above configuration example, when the peripheral device is to be used from the predetermined communication device, authentication of the peripheral device is performed first, and then, the communication process through encrypted communication can be executed. Thus, safety in use of the peripheral device can be enhanced.

Further, as another configuration example, a random number may be used as the second data.

According to the above configuration example, safety in the authentication process can be further increased.

Further, as another configuration example, the peripheral device may further include: a storage section configured to set a valid period of bonding information and then store the bonding information in the storage section, the bonding information being information to be used when the peripheral device is to be re-connected to the predetermined communication device to which the peripheral device has been connected once; and a valid period determination section configured to determine whether the valid period has elapsed, before communication of the peripheral device with the predetermined communication device is started. Then, when the valid period determination section has determined that the valid period has elapsed, the processes by the first communication section, the second communication section, and the third communication section may be executed again, and then the communication process by the communication process execution section may be executed.

According to the above configuration example, while using a highly versatile wireless communication standard, periodic execution of the authentication processes for the peripheral device can be realized. In addition, while enhancing convenience, safety in use of the peripheral device can be ensured.

One example of another configuration example is a wireless communication chip capable of performing Bluetooth communication, the wireless communication chip including a valid period information storage section configured to store therein information of a valid period for which Bluetooth communication with a predetermined communication device is permitted. Further, the information of the valid period may be information indicating a date, or alternatively, the information of the valid period may be a counter for counting a predetermined number of times.

According to the above configuration example, with respect to communication with the predetermined communication device, the valid period for which the communication is permitted can be set. When the valid period has elapsed, for example, a predetermined process for permitting communication, such as the authentication process, can be executed.

One example of another configuration example is a peripheral device capable of performing data communication with a predetermined communication device, and the peripheral device includes a connection section, a bonding information storing section, a valid period storing section, a valid period determination section, and a re-authentication section. The connection section is configured to connect the peripheral device to the predetermined communication device through short-range wireless communication. The bonding information storing section is configured to store, in a storage section, bonding information which is information to be used when the peripheral device is to be re-connected to the predetermined communication device to which the peripheral device has been connected once by the connection section. The valid period storing section is configured to store, in the storage section, valid period information indicating a valid period of the bonding information on the basis of a result of an authentication process for authenticating the peripheral device, the authentication process having been executed between the peripheral device and a predetermined authentication server. The valid period determination section is configured to determine whether the valid period has elapsed, before communication of the peripheral device with the predetermined communication device is started. The re-authentication section is configured to execute again the authentication process that uses the predetermined authentication server when it has been determined that the valid period has elapsed.

According to the above configuration example, the valid period can be set to the bonding information, and when the valid period has elapsed, the authentication process can be executed again.

Further, as another configuration example, the communication between the peripheral device and the predetermined communication device may be performed in the form of Bluetooth (registered trademark) communication.

According to the above configuration example, while using a highly versatile wireless communication standard, periodic execution of the authentication processes for the peripheral device can be realized. In addition, while enhancing convenience, safety in use of the peripheral device can be ensured.

One example of another configuration example is a computer-readable non-transitory storage medium having stored therein an application program to be executed by a computer of a predetermined communication device that uses a predetermined peripheral device communicably connected thereto, the application causing the computer to perform operations including: receiving a transmission request for an application ID from the peripheral device; transmitting the application ID of the application program that has been activated, to the peripheral device in response to the transmission request; and executing a predetermined process involving a communication process with the peripheral device when verification of the application ID in the peripheral device has succeeded. It should be noted that the application ID may be an ID inherent to each application. The computer-readable storage medium here includes, for example, a flash memory, magnetic media such as ROM and RAM, and optical media such as CD-ROM, DVD-ROM, and DVD-RAM.

According to the above configuration example, when a peripheral device is to be used, authenticity of the peripheral device can be confirmed. In addition, on the peripheral device side, authenticity of the application that is to serve as the communication counterpart can be confirmed.

One example of another configuration example is an application program to be executed by a computer of a predetermined communication device communicably connected to a predetermined server, the application program causing the computer to perform operations including: receiving a transmission request for an application ID from the server; transmitting the application ID of the application program that has been activated, to the server in response to the transmission request; and executing a predetermined process involving a communication process with a predetermined peripheral device. Then, when verification of the application ID in the server has succeeded after the application ID had been transmitted, execution of the predetermined process involving the communication process with the predetermined peripheral device is permitted. It should be noted that the application ID may be an ID inherent to each application.

According to the above configuration example, at the time of the authentication process for the peripheral device, authenticity of the application that is to serve as the communication counterpart of the peripheral device can be confirmed.

One example of another configuration example is an application program to be executed by a computer of a predetermined communication device communicably connected to a predetermined server, the application program causing the computer to perform operations including: receiving a transmission request for a client certificate from the server; transmitting the client certificate stored in a storage section of the predetermined communication device, to the server in response to the transmission request; and executing a predetermined process involving a communication process with a predetermined peripheral device. Then, when verification of authenticity of the client certificate in the server has succeeded after the client certificate had been transmitted, execution of the predetermined process involving the communication process with the predetermined peripheral device is permitted.

According to the above configuration example, when the peripheral device is to be used, high reliability of the application program and the communication device serving as the communication counterpart of the peripheral device can be confirmed.

One example of another configuration example is an information processing system including a server, a predetermined communication device, and a peripheral device capable of performing data communication with the predetermined communication device. The peripheral device includes: a first communication section, a second communication section, a third communication section, and a communication process execution section. The first communication section is configured to transmit, to the server, an encryption key for encrypted communication, identification information which is information capable of uniquely identifying the peripheral device, and signature information which is a digital signature of the identification information. The second communication section is configured to receive, from the server, first data which is data based on a result of an authentication process executed in the server on the basis of the identification information and the signature information transmitted by the first communication section, then, to encrypt, with the encryption key, request information indicating a transmission request for second data, and to transmit the encrypted request information to the server. The third communication section is configured to receive the second data encrypted and transmitted from the server in response to the request information transmitted by the second communication section, then, to decrypt the encrypted second data by use of the encryption key, and to transmit the decrypted second data to the server. The communication process execution section is configured to receive, from the server, third data which is data based on a result indicating that authenticity of the second data transmitted by the third communication section has been confirmed in the server, and then to execute a communication process using fourth data encrypted with the encryption key, between the peripheral device and the predetermined communication device. The server includes: an authentication processing section, a first data transmission section, a second data transmission section, and a third data transmission section. The authentication processing section is configured to execute an authentication process regarding the peripheral device on the basis of the identification information and the signature information transmitted by the first communication section. The first data transmission section is configured to transmit, to the peripheral device, the first data based on a result of the authentication process. The second data transmission section is configured to, in response to the request information transmitted by the second communication section, encrypt the second data by using the encryption key and transmit the encrypted second data to the peripheral device. The third data transmission section is configured to confirm authenticity of the second data transmitted by the third communication section, and to transmit the third data based on a result of the confirmation, to the peripheral device. Transmission/reception of data between the peripheral device and the server is performed via the predetermined communication device.

According to the above configuration example, when the peripheral device is to be used from the predetermined communication device, authentication of the peripheral device is performed first, and then, the communication process through encrypted communication can be executed. In addition, safety in use of the peripheral device can be enhanced, and further, versatility of the peripheral device can be enhanced.

Further, as another configuration example, data transmitted/received between the peripheral device and the server may have been encrypted. In addition, the peripheral device may further include: an encrypted data transmission section configured to encrypt fifth data with a common key and transmit the encrypted fifth data to the server; a decrypted data reception section configured to receive, from the server, the fifth data decrypted in the server; and a determination section configured to determine authenticity of the server, by determining whether the fifth data before having been encrypted matches the fifth data received by the decrypted data reception section. The server may further include a data decryption section configured to decrypt the encrypted fifth data transmitted by the encrypted data transmission section, and to transmit the decrypted fifth data to the peripheral device being a transmission source thereof.

According to the above configuration example, with respect to the authentication process for the peripheral device, a safer authentication process can be performed.

According to the exemplary embodiments, when a peripheral device is to be used, an authentication process of the peripheral device is performed first, then and after the peripheral device has been authenticated, use of the peripheral device can be permitted. Accordingly, safety in use of the peripheral device can be increased.

DETAILED DESCRIPTION OF NON-LIMITING EXAMPLE EMBODIMENTS

Figure 1:
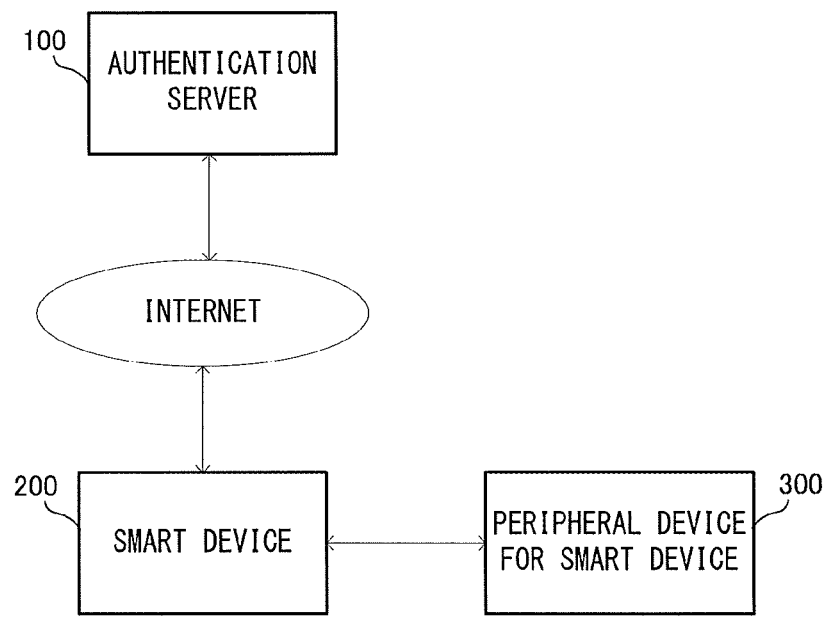
FIG. 1 is a schematic diagram showing the entirety of an authentication system according to an exemplary embodiment.

Hereinafter, exemplary embodiments will be described.

First, in the present exemplary embodiment, the following use mode is assumed. First, it is assumed that there is a communication device, specifically, a smart device such as a smartphone, which is communicable with a predetermined server. In addition, it is assumed that there is a peripheral device that can be used at the smart device. It is assumed that this peripheral device can be connected to the smart device by Bluetooth (registered trademark) technology. In other words, It is assumed that the peripheral device is a Bluetooth device. Further, a predetermined application is installed in the smart device. Then, a case is assumed in which a user uses the application while causing the application to operate in cooperation with the peripheral device. For example, the peripheral device is a device regarding health management or fitness, and the application is an application that allows the user to perform health management, training, and the like while using the peripheral device. In the description below, such an application will be referred to as "dedicated application".

When using the dedicated application as described above, first, it is necessary to connect the peripheral device to the smart device, to establish a state where the application can be used. Here, with respect to the peripheral device, from the viewpoint of prevention of, for example, impaired feeling of usage caused by a bad quality product or the like, and ensuring safety by satisfying a predetermined standard (prevention and the like of accidents due to a peripheral device that does not satisfy safety standard), it is preferable to use a so-called "authentic product/genuine product" or "operation-confirmed product". An example of such a product is a peripheral device whose operation has been confirmed by the manufacturer of the dedicated application, or a peripheral device developed and sold by the manufacturer of the dedicated application. In particular, if a peripheral device has been developed and sold by the manufacturer of the dedicated application (so-called genuine product), such a peripheral device can be considered as having high safety in use.

From the viewpoint as described above, this exemplary embodiment assumes a case where a "genuine product" provided by the manufacturer of the dedicated application is used as the peripheral device, in the use mode as described above. For example, a case is considered in which the manufacturer provides the peripheral device and the dedicated application in a combination. The technology to be described in the present exemplary embodiment relates to a technology for authenticating, when the dedicated application is to be used, the authenticity (for example, whether or not the product is genuine) of the peripheral device as described above that is to be used in cooperation with the dedicated application. That is, in the present exemplary embodiment, a process of checking whether the peripheral device is a genuine product is performed before the execution of the dedicated application.

Here, in a case where the peripheral device authentication process as described above is performed, it is conceivable that the authentication process is performed on the smart device, in general. However, in these days, smart devices are provided in various models, and can also be said as generalized devices. Therefore, it may be difficult for the manufacturer of the dedicated application to grasp or predict which user uses what type of smart device. Also, there could be a risk that the dedicated application is modified, or that authentication process for the peripheral device is avoided via another application being interposed. For example, assuming that a peripheral device that is not a genuine product is present, a case could happen in which: for example, the dedicated application is modified in some way; and the peripheral device that is not a genuine product is used without the above-described authentication process being performed.

Thus, in the present exemplary embodiment, the peripheral device authentication process as described above is not performed on the smart device side. Specifically, an authentication server (hereinafter, authentication server) is prepared, and the smart device (dedicated application) performs relay, whereby authentication process is performed between the peripheral device and the server, to realize a state where the peripheral device can be used via the dedicated application. Furthermore, in the present exemplary embodiment, a process of checking the authenticity of the dedicated application itself is also executed.

In the description below, a term "authentication" and a term "verification" are used. In the description below, "authentication" means confirming authenticity of a peripheral device, and corresponds to a series of procedures described later. That is, the series of procedures described later correspond to an "authentication process". On the other hand, "verification" means a process performed as appropriate in the series of procedures for authentication described later, and mainly, is a process of checking authenticity of data that is communicated during the authentication process. For example, "verification" is a process for verifying that the entity having transmitted a received "certificate" is an authentic transmission entity.

First Exemplary Embodiment

The first exemplary embodiment will be described below. First, the overall configuration of a peripheral device authentication system that is assumed in the first exemplary embodiment will be described. FIG. 1 is a schematic diagram showing the entirety of the authentication system in the present exemplary embodiment. In FIG. 1, an authentication server 100, a smart device 200, and a peripheral device for smart device 300 (hereinafter, simply referred to as peripheral device). The authentication server 100 is connected to the Internet. The smart device 200 is also connected to the Internet. The authentication server 100 and the smart device 200 are communicable with each other via the Internet. The smart device 200 and the peripheral device 300 are wirelessly connected to each other using a Bluetooth technology as described above. Thus, wireless communication in accordance with the Bluetooth standard is basically performed between the smart device 200 and the peripheral device 300.

Figure 2:
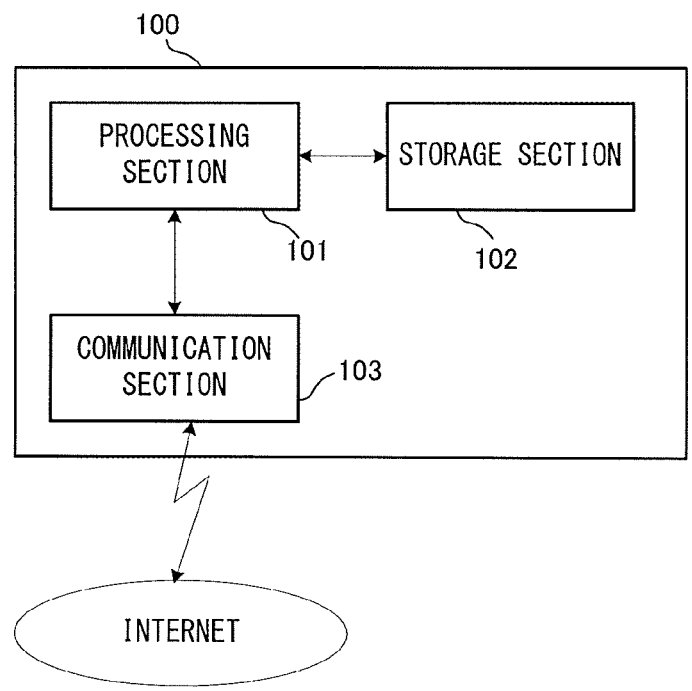
FIG. 2 is a schematic diagram showing a hardware configuration of an authentication server 100.

Next, hardware configurations of the authentication server 100, the smart device 200, and the peripheral device 300 will be described. FIG. 2 is a schematic diagram showing a hardware configuration of the authentication server 100. The authentication server 100 includes a processing section 101, a storage section 102, and a communication section 103. The processing section 101 is a predetermined processor or the like, and executes various types of information processing on the server side in the authentication process according to the present exemplary embodiment. Various types of data (database, etc.) to be used in the process are stored in the storage section 102. In accordance with control by the processing section 101, the communication section 103 is connected to the Internet and performs communication with the smart device 200. Although not shown, the authentication server 100 also includes various types of components for realizing the function as a server.

Figure 3:
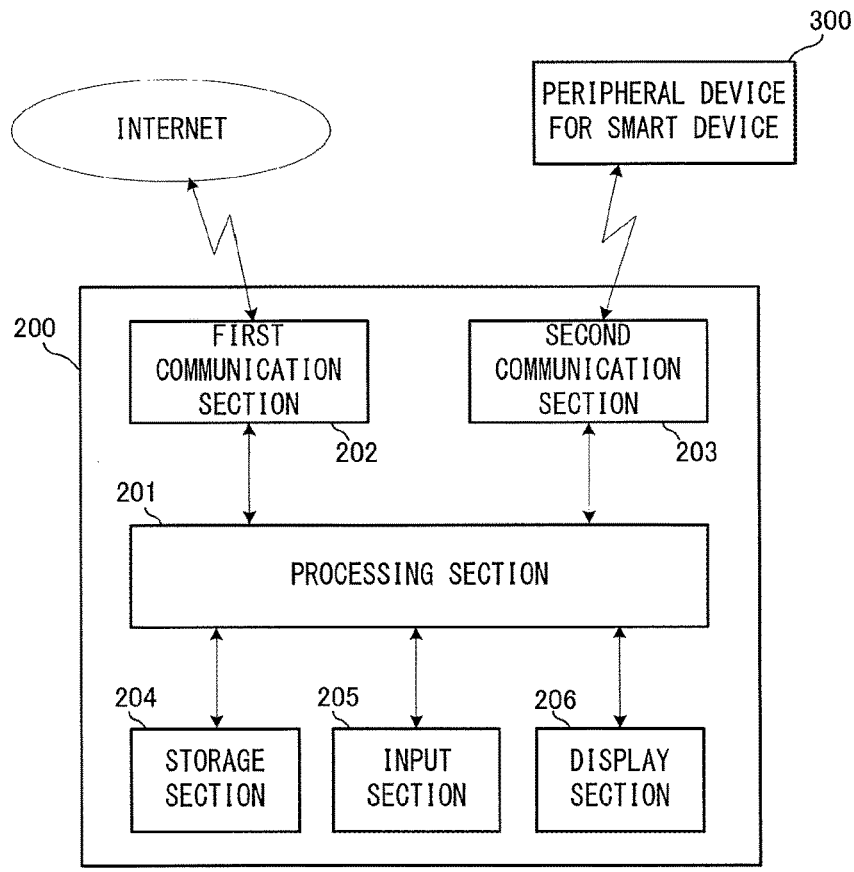
FIG. 3 is a schematic diagram showing a hardware configuration of a smart device 200.

Next, FIG. 3 is a schematic diagram showing a hardware configuration of the smart device 200. The smart device 200 is an information device such as a smartphone, a tablet terminal, or the like. The smart device 200 includes a processing section 201, a first communication section 202, a second communication section 203, a storage section 204, an input section 205, and the like. The processing section 201 executes various types of information processing such as execution of a dedicated application. The first communication section 202 has a function of performing communication by being connected to the Internet in accordance with control by the processing section 201. In the present exemplary embodiment, the first communication section 202 is assumed to be a wireless module that has a wireless LAN function. The first communication section 202 transmits/receives various types of data to/from the authentication server 100 via the Internet in accordance with control by the processing section 201. The second communication section 203 has a function of communicating with the peripheral device 300. In the present exemplary embodiment, the second communication section 203 is assumed to be a Bluetooth module. The second communication section 203 performs communication with the peripheral device 300 by using a Bluetooth technology in accordance with control by the processing section 201. The storage section 204 is a flash memory, for example, and an application program, various types of data, and the like are stored in the storage section 204. The input section 205 is for receiving an input from the user made onto the smart device, and implemented by a touch panel, various types of buttons, and the like. A display section 206 is a screen on which to display a result and the like of various types of information processing.

Figure 4:
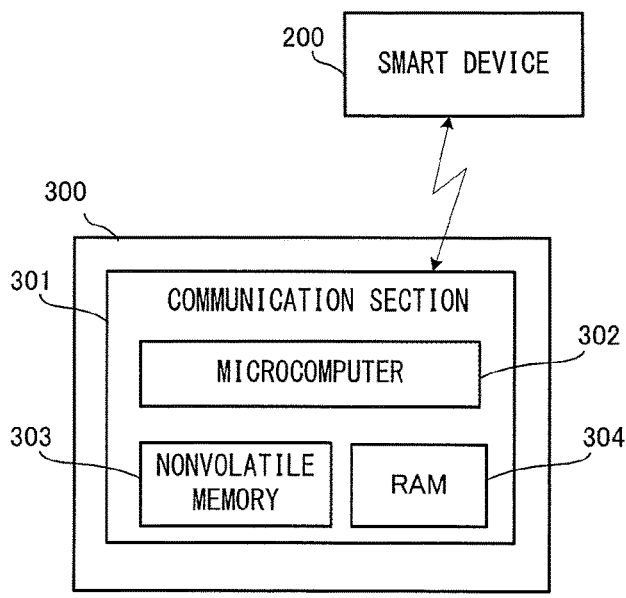
FIG. 4 is a schematic diagram showing a hardware configuration of a peripheral device 300.

FIG. 4 is a schematic diagram showing a hardware configuration of the peripheral device 300. The peripheral device 300 includes a communication section 301. Although not shown, the peripheral device 300 also includes various types of hardware components that are necessary for executing the dedicated application, such as operation buttons, various types of sensor, and the like. The communication section 301 is a communication chip, for example (more specifically, Bluetooth chip or Bluetooth module), and has a function for performing short-range wireless communication with the smart device 200. The communication section 301 includes a microcomputer 302, a nonvolatile memory 303, and a RAM 304. In the nonvolatile memory 303, a program and data for executing processes described later are stored. The program is to be executed by the microcomputer 302. Various types of data necessary in the processes described later are stored in the RAM 304 as appropriate.

Next, the outline of the authentication process to be executed in the present exemplary embodiment will be described. In the present exemplary embodiment, the following operation flow is assumed in general. First, the user installs the dedicated application in the smart device 200 and activates the dedicated application. This is the initial activation, and thus, a peripheral device authentication process is executed. The details thereof will be described later, but at the start of this authentication process, first, wireless connection is established between the smart device 200 and the peripheral device 300, thereby realizing a state where the smart device 200 and the peripheral device 300 can perform communication with each other. At this time point, this state is a state where the minimum communication is allowed therebetween and where it is not known whether the peripheral device can be used via the dedicated application (that is, the peripheral device 300 has not been authenticated). Then, transmission/reception and the like of various types of data are performed between the peripheral device 300 and the authentication server 100 using the smart device 200 as a relaying device, whereby the authentication process progresses. Thus, for execution of the authentication process, it is necessary for the smart device 200 to be in a state where the smart device 200 can perform Internet communication (communication with the authentication server 100). If the peripheral device 300 is normally authenticated as a result of the authentication process, predetermined information (bonding information and the like described later) is stored in the nonvolatile memory 303 of the peripheral device 300. When the authentication process ends, the peripheral device 300 became able to be used (encrypted communication therebetween is enabled) via the dedicated application. Then, the peripheral device 300 is normally activated, and a predetermined process by the dedicated application using the peripheral device 300 is executed.

Once the peripheral device 300 has been normally authenticated, a simple checking process based on predetermined information stored in the nonvolatile memory 303 is executed in the peripheral device 300 at the next activation of the dedicated application. This is a simple process for verifying authenticity of the dedicated application (the smart device 200) which is the communication counterpart viewed from the peripheral device 300 side. When the verification has succeeded, the peripheral device 300 is normally activated. That is, once the peripheral device 300 has been normally authenticated, the authentication process using the authentication server 100 can be omitted, basically. Accordingly, convenience for the user can be enhanced.

In the present exemplary embodiment, with respect to the predetermined information stored in the nonvolatile memory 303 at normal authentication of the peripheral device 300, a valid period is set. When the valid period has elapsed, the authentication process using the authentication server 100 needs to be performed again. That is, the present exemplary embodiment employs a configuration in which execution of the authentication process is periodically requested even if the peripheral device 300 that is a genuine product.

According to the present exemplary embodiment, by performing the processes as described above, it is possible to confirm safety and authenticity of the peripheral device 300 and to ensure convenience for the user.

Next, operations performed in the authentication process in the present exemplary embodiment will be described in more detail. First, various types of data to be used in this process will be described.

Figures 5, 6:
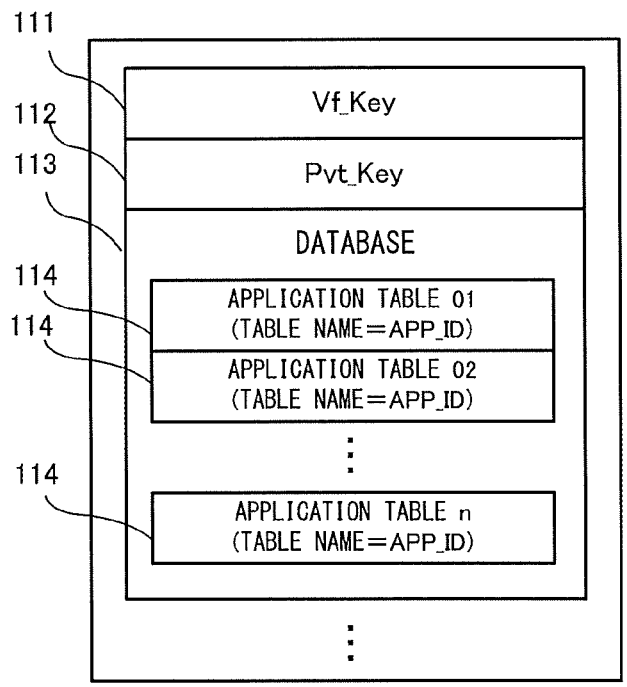
FIG. 5 shows data stored in a storage section 102 of an authentication server 100.
FIG. 6 shows one example of a configuration of an application table 114.

FIG. 5 shows data stored in the storage section 102 of the authentication server 100. A Vf_Key 111, a Pvt_Key 112, a database 113, and the like are stored in the storage section 102. The Vf_Key 111 is a verification key for verifying a BT_Sign which is a digital signature described later. The Pvt_Key 112 is a "private key" in a public key system which is one of encryption systems, and is paired with a Pub_Key 313 stored in the peripheral device 300 described later.

The database 113 is a database regarding the peripheral device 300 that is a genuine product. The database 113 includes a plurality of application tables 114. With respect to the application tables 114, one application table 114 is prepared for one dedicated application. For example, it is assumed that, as dedicated applications that use the peripheral device 300, there are three applications, i.e., an application A, an application B, and an application C (the functions realized by the applications are different from each other). In this case, as the application tables 114, three tables are prepared. That is, an application table 114 for the application A, an application table 114 for the application B, and an application table 114 for the application C are prepared.

FIG. 6 shows one example of a configuration of each application table 114. The application table 114 has items such as a BT_Addr 115, a user ID 116, a PWD 117, and the like. The BT_Addr 115 is data for uniquely identifying the peripheral device 300. In the present disclosure, an exemplary case is described in which the peripheral device 300 is a Bluetooth device. Thus, the address inherent to the Bluetooth device (also referred to as BD device address or BD address) is used as the BT_Addr 115. Here, supplementary description is given of registration of data of the BT_Addr 115. First, when peripheral devices 300 have been manufactured, addresses inherent to the respective peripheral devices 300 are stored in the form of a predetermined list. In other words, a list of addresses inherent to all the manufactured peripheral devices 300 is prepared. Then, data of the BT_Addr 115 is registered on the basis of the list (by importing data from the list, for example). The application table 114 generated in this manner also serve as, so to speak, a white list for the BT_Addr 115.

The user ID 116 and the PWD 117 are information of user account. As described later, in the present disclosure, prior to use of each dedicated application, user account information is requested. For example, at the initial activation of the dedicated application, a process for creating a user account is executed. The user ID 116 and the PWD 117 is data indicating a user ID and a password inputted by the user in this account creation process. That is, the user ID 116 and the PWD 117 are registered in the database 113 through this account creation process.

In the present exemplary embodiment, for convenience of explanation, it is assumed that for one BT_Addr 115 (one peripheral device 300), a user ID/a password for one person can be registered. However, another embodiment may employ a configuration in which, for one BT_Addr 115, user IDs/passwords can be registered for a plurality of persons. For example, when it is assumed that one peripheral device is used via smart devices (dedicated applications) owned by respective family members, such a configuration may be employed.

Figure 7:
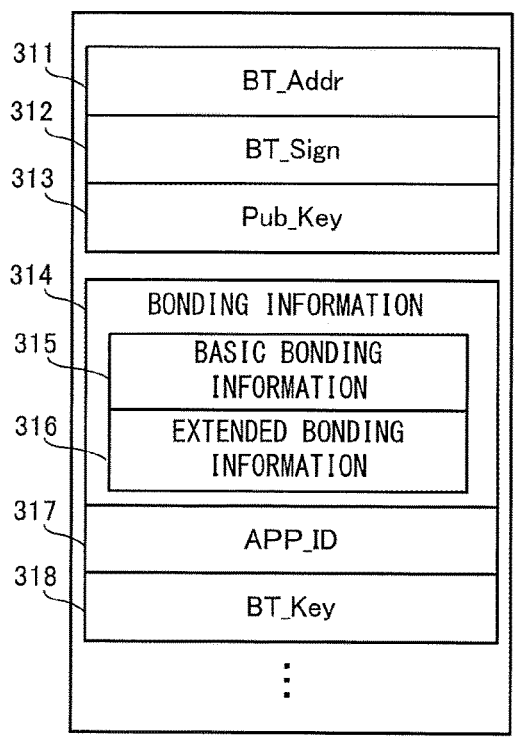
FIG. 7 shows data stored in a nonvolatile memory 303 of the peripheral device 300.

Next, data stored in the peripheral device 300 will be described. FIG. 7 shows data stored in the nonvolatile memory 303 of the peripheral device 300. In the nonvolatile memory 303, a BT_Addr 311, a BT_Sign 312, a Pub_Key 313, bonding information 314, an APP_ID 317, a BT_Key 318, and the like are stored.

The BT_Addr 311 is an address that is inherent to the peripheral device 300 and determined at the time of manufacture thereof. In other words, the BT_Addr 311 is device identification information for uniquely identifying the peripheral device 300. The BT_Addr 311 is also data to be registered as the BT_Addr 115 in an application table 114 of the database 113. In the description below, the BT_Addr 311 and the BT_Addr 115 may be simply referred to as "BT_Addr" which is intended to mean "address inherent to peripheral device 300".

The BT_Sign 312 is a digital signature generated at the time of manufacture of the peripheral device 300 and stored (written). Specifically, the BT_Addr 311 encrypted by use of a signature key Sign_Key (not shown) is stored as the BT_Sign 312 in the nonvolatile memory 303. The signature key Sign_Key is paired with the Vf_Key 111 stored in the authentication server.

The Pub_Key 313 is a public key in the encrypted communication and is paired with the Pvt_Key 112 stored in the authentication server 100.

The BT_Addr 311, the BT_Sign 312, and the Pub_Key 313 are written in the nonvolatile memory 303 at the manufacture of the peripheral device 300. That is, at the time point when, for example, the user purchased the peripheral device 300, these pieces of data have already been stored in the peripheral device 300. On the other hand, the bonding information 314, the APP_ID 317, and the BT_Key 318 are subjected to the authentication process and the like according to the present exemplary embodiment, and then stored in the peripheral device 300 in the end.

The bonding information 314 is information regarding a connection combination of the smart device 200 and the peripheral device 300. In the present exemplary embodiment, "bonding" means sharing of connection information between the smart device 200 and the peripheral device 300. Such connection information is bonding information, and is used for simplifying the procedures at the time of re-connection between the smart device 200 and the peripheral device 300. For example, in a state where a peripheral device 300 and a smart device 200 have never been connected to each other, when the user performs a predetermined connection establishing operation, thereby establishing connection therebetween (when actual connection has been made), the peripheral device 300 and the smart device 200 exchange their own information (information of their connection counterpart such as inherent address) with each other and store the received information in the peripheral device 300 and the smart device 200, respectively. Accordingly, at the next connection, by use of this information, connection can be automatically established again without the user performing the predetermined connection establishing operation. Such information for automatically establishing connection again is the bonding information. In the description below, a state where such connection information is not stored may also be referred to as "non-bonded state", and a state where bonding information has been stored may also be referred to "bonded state".

In the present exemplary embodiment, the bonding information 314 includes basic bonding information 315 and extended bonding information 316. The basic bonding information 315 is predetermined data based on the Bluetooth standard, and includes the address, identification information, and the like of the connection counterpart. It is possible to determine that the state is "bonded state" when the basic bonding information 315 has been set and the state is "non-bonded state" when the basic bonding information 315 has not been set.

Figure 8:
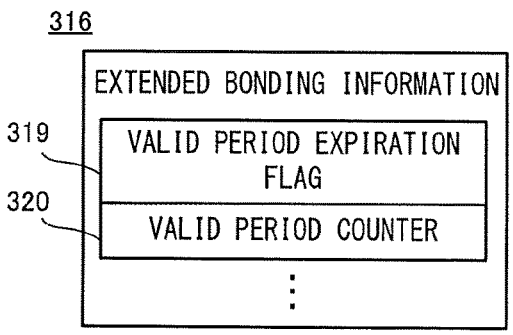
FIG. 8 is one example of a data configuration of extended bonding information 316.

The extended bonding information 316 is extended data, of the peripheral device 300 itself, that is to be used in the present exemplary embodiment. Specifically, the extended bonding information 316 includes data for setting a "valid period" to the bonding information 314 (the basic bonding information 315). FIG. 8 shows one example of a data configuration of the extended bonding information 316. The extended bonding information 316 includes a valid period expiration flag 319, a valid period counter 320, and the like. The valid period expiration flag 319 is a flag indicating whether the valid period of the bonding information 314 has not expired, or the valid period has expired. In the present exemplary embodiment, True means that the valid period has expired, and False means that the valid period has not expired. The valid period counter 320 is data indicating the valid period, and is also a counter for counting the valid period. For example, it is assumed that the valid period of the bonding information 314 is "60 days". In this case, for example, at the timing when the bonding information 314 has been updated, a value of "60" is set in the valid period counter. Then, the microcomputer 302 of the peripheral device 300 performs a process of counting down, by 1 per day, the valid period counter 320, and when the valid period has expired (when the counter shows 0), sets True to the valid period expiration flag 319. In other words, the extended bonding information 316 can be said as information for indicating whether connection between the smart device 200 (dedicated application) and the peripheral device 300 is permitted.

In another exemplary embodiment, the extended bonding information 316 may be configured to include the above-described flag indicating "non-bonded state" or "bonded state". Then, whether the state is "bonded state" or "non-bonded state" may be determined by use of this flag.

With reference back to FIG. 7, the APP_ID 317 is an application ID for identifying the dedicated application. In the present exemplary embodiment, this data is used mainly for confirmation and the like of authenticity of the dedicated application. After the peripheral device has been normally authenticated, if the dedicated application is activated again, a checking process using this data is performed in order to skip the authentication process that uses the authentication server.

The BT_Key 318 is data to be used as a "key" when encrypted communication is to be performed between the peripheral device 300 and the smart device 200 (dedicated application). This is generated during the authentication process described later. After the peripheral device has been normally authenticated, various types of data are encrypted with the BT_Key 318, and then, the resultant data is transmitted/received between the peripheral device 300 and the smart device 200 (dedicated application).

Although not shown, various types of data necessary in the authentication process described later are generated as appropriate and stored in the RAM 304 of the peripheral device 300.

Figure 9:
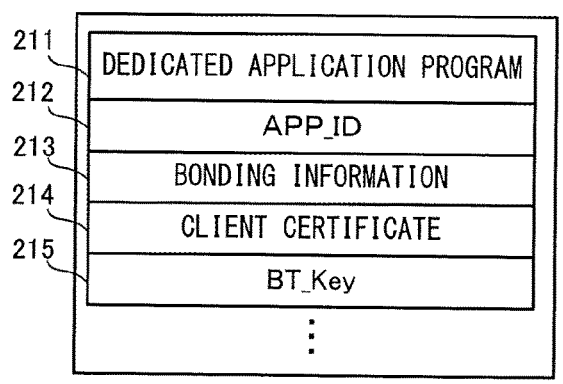
FIG. 9 shows data stored in a storage section 204 of the smart device 200.

Next, data stored in the storage section 204 of the smart device 200 will be described. FIG. 9 shows data stored in the storage section 204 of the smart device 200. A dedicated application program 211, an APP_ID 212, bonding information 213, a client certificate 214, a BT_Key 215, and the like are stored in the storage section 204.

The dedicated application program 211 is a program for executing processes on the smart device side in the authentication process described later. The APP_ID 212 is an application ID that corresponds to the dedicated application program. If the authentication process has been normally performed, the APP_ID 317 stored in the peripheral device 300 is the same as the APP_ID 212. In the description below, the APP_ID 317 and the APP_ID 212 may be collectively and simply referred to as "APP_ID" which is intended to mean "application ID".

The bonding information 213 is information regarding a connection combination of the smart device 200 and the peripheral device 300. The bonding information 213 is paired with the bonding information 314 of the peripheral device 300. The bonding information 213 has a data configuration of the bonding information 314 in the peripheral device 300 from which the extended bonding information 316 is deleted (i.e., substantially, the basic bonding information 315 only).

The client certificate 214 is data for certifying that the smart device 200 has an authorized access right to the authentication server 100, and the like (data to be used in so-called access control). The client certificate 214 is data (issued from the authentication server 100 also serving as a certificate authority) generated at the time of registration of the user account of the dedicated application. The client certificate 214 also includes so-called client public key and client private key. By using these keys, encrypted communication between the smart device 200 and the communication counterpart (the authentication server 100) is enabled.

The BT_Key 215 is data serving as a key for allowing encrypted communication to be performed between the peripheral device 300 and the smart device 200 (dedicated application). That the authentication process normally ends means that this data is stored. The content thereof is the same as the content of the BT_Key 318. In the description below, in view of that the contents of the BT_Key 318 and the BT_Key 215 (further, BT_Key temporarily stored in the authentication server 100) are the same, these keys may be collectively referred to as BT_Key which is intended to mean "key" for encrypted communication.

Although not shown, other data necessary in processes according to the present exemplary embodiment is also stored in the storage section 204 as appropriate.

Figure 10:
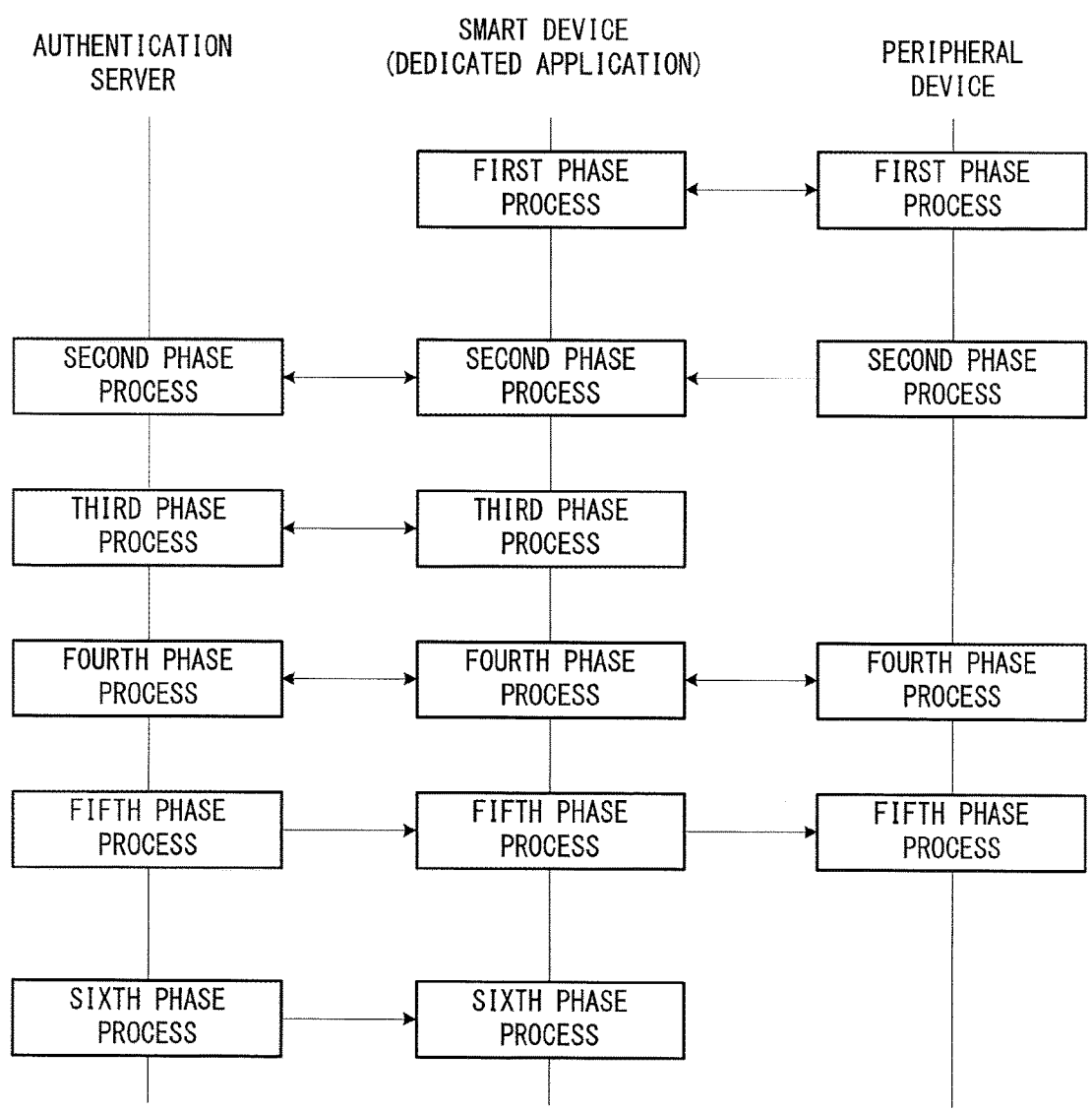
FIG. 10 is a diagram for explaining the outline of an authentication process in a first exemplary embodiment.

Next, the flow of the authentication process according to the present exemplary embodiment will be described. For convenience of explanation, in the following, the authentication process is divided into some "phases" to be explained. First, with reference to FIG. 10, the overview of the flow of the authentication process according to the present exemplary embodiment and the outline of the process performed in each phase will be described. Then, details of the process in each phase will be described. In FIG. 10, process phases are shown in the order of, from left, the authentication server 100, the smart device 200, and the peripheral device 300. The phases are arranged in time series in the vertical direction. Each arrow in the horizontal direction shows that transmission/reception of data is performed.

First, the outline of a first phase process will be described. The process in this phase is a process performed between the smart device 200 and the peripheral device 300. Mainly, a process of establishing connection between the smart device 200 (dedicated application) and the peripheral device 300, and a process of determining necessity of the authentication process involving communication with the authentication server 100 are executed. When it has been determined that the authentication process involving communication with the authentication server 100 is not necessary, a comparatively simple verification process for verifying authenticity of the smart device 200 (dedicated application) as the communication counterpart is executed on the peripheral device side. When verification has succeeded, the authentication process for this procedure ends and the peripheral device 300 is to be normally activated.

Next, the outline of a second phase process will be described. The process in this phase is performed among three parties, i.e., the authentication server 100, the smart device 200, and the peripheral device 300. Mainly, in this phase, a process of generating a BT_Key 318, and a process of verifying authenticity of the peripheral device 300 and the dedicated application on the authentication server side are executed.

Next, the outline of a third phase process will be described. The process in this phase is performed between the authentication server 100 and the smart device 200. Mainly, a process is executed in which a client certificate is transmitted from the smart device 200 (dedicated application) to the authentication server 100 and the client certificate is verified on the authentication server 100 side. That is, executed is a process of checking, on the basis of the client certificate, authenticity of access right of the smart device 200 (i.e., whether the smart device 200 is a terminal whose access to the authentication server 100 is permitted or not). It should be noted that, at the initial activation of the dedicated application, since a client certificate has not yet been created (user account has not been created), a process of creating a user account is performed (as a result, the client certificate is also created).

Next, the outline of a fourth phase process will be described. The process in this phase is performed among three parties, i.e., the authentication server 100, the smart device 200, and the peripheral device 300. However, since the smart device 200 mainly serves as a relaying device, transmission/reception is performed substantially between the authentication server 100 and the peripheral device 300. In this phase, prior to the encrypted communication to be performed in the subsequent phases, a process is performed in which the authentication server 100 and the peripheral device 300 confirm with each other whether the authentication server 100 and the peripheral device 300 are reliable communication counterparts with each other.

Next, the outline of a fifth phase process will be described. The process in this phase is also performed among the three parties, i.e., the authentication server 100, the smart device 200, and the peripheral device 300. However, the smart device 200 mainly serves as a relaying device, and transmission/reception is performed substantially between the authentication server 100 and the peripheral device 300. In the process in this phase, mainly, a process and the like are executed in which data for allowing the authentication process of the next time and thereafter to be skipped is encrypted and transmitted from the authentication server 100 to the peripheral device 300.

Next, the outline of a sixth phase process will be described. The process in this phase is performed between the authentication server 100 and the smart device 200. In this phase, a process is executed in which "key" data (BT_Key described above) to be used when encrypted communication is to be performed with the peripheral device 300 is transmitted from the authentication server 100 to the smart device 200 (dedicated application).

Hereinafter, details of the process in each phase will be described. In the description below, each process shown in the drawing (flow chart) is assigned with a reference sign. This reference sign is provided in accordance with the following naming convention: "phase number abbreviation"-"execution entity abbreviation"-"step number". With respect to the phase number abbreviation, for example, phase 1 is expressed as "Ph1". With respect to the execution entity abbreviation, the authentication server is expressed as "SV", the smart device is expressed as "SD", and the peripheral device is expressed as "PP". The step number is expressed as "Sn (n is an integer)". For example, the first process performed in the peripheral device in phase 1 is expressed as "Ph1-PP-S1".

It is assumed that, prior to the start of the processes, the peripheral device 300 is in a state of being energized and able to be normally used, and also, the smart device 200 is in a state of being able to perform Internet communication (a state in which the smart device 200 can communicate with the authentication server 100). In this state, when the above-described dedicated application is activated in the smart device 200, the process described below is started.

In the description below, with respect to the execution entity of each process, the processing section 101 serves as the execution entity for the authentication server 100, the processing section 201 serves as the execution entity for the smart device 200, and the microcomputer 302 serves as the execution entity for the peripheral device 300.

Figure 11:
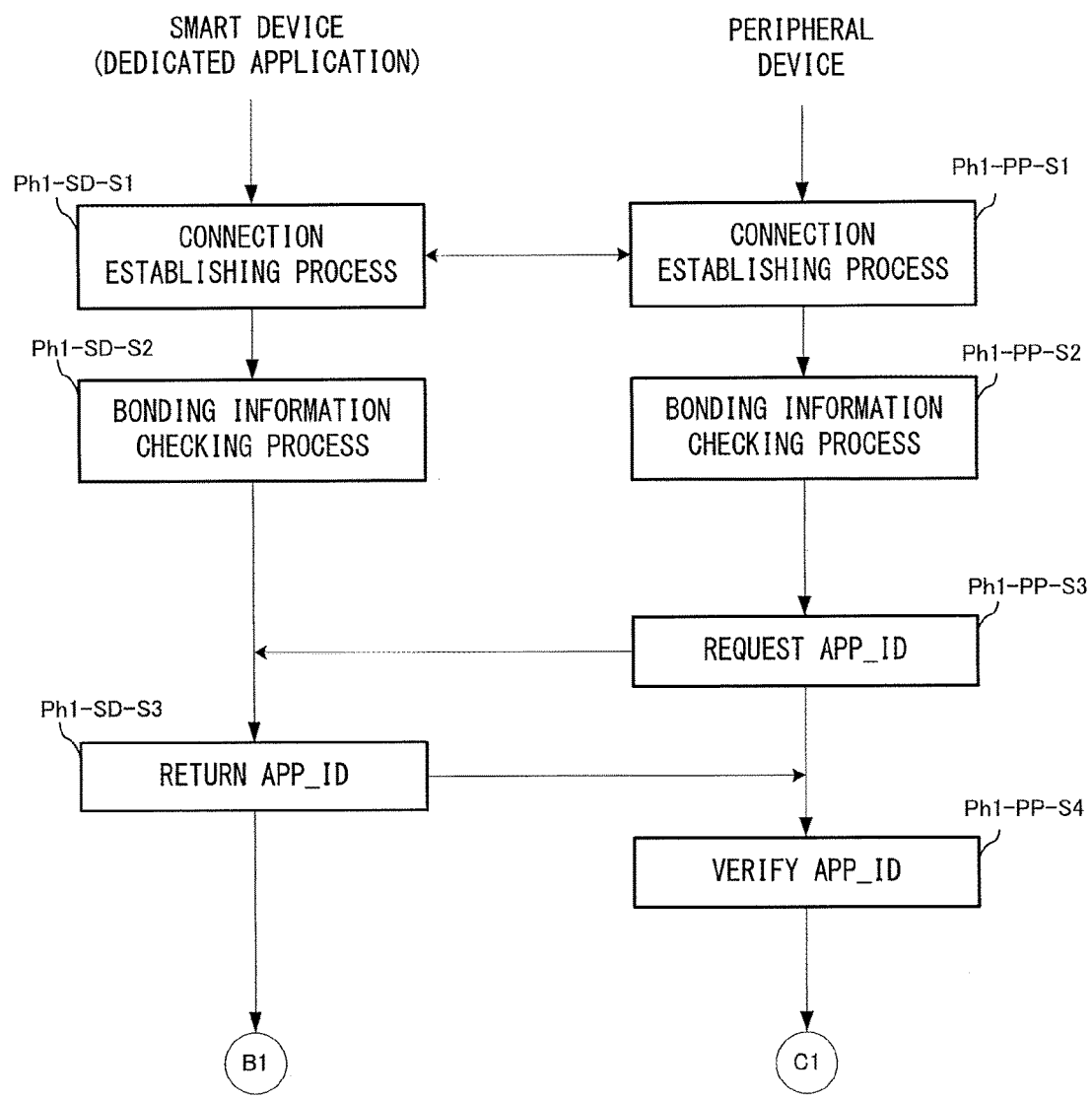
FIG. 11 is a flow chart showing details of a first phase process in the first exemplary embodiment.

First, details of the first phase process will be described. FIG. 11 is a flow chart showing the details of the first phase process. The left flow in FIG. 11 indicates the flow of the process performed on the smart device (dedicated application) side, and the right flow indicates the flow of the process performed on the peripheral device 300 side. As described above, in this process, mainly, a process of establishing connection between the smart device 200 and the peripheral device 300, and a process of determining necessity of the authentication process are executed. When it has been determined that the authentication process is not necessary, the authentication process regarding the procedure ends at that time point, and the peripheral device 300 is to be normally activated. First, upon activation of the dedicated application, the process for establishing connection between the peripheral device 300 and smart device is executed (Ph1-SD-S1 and Ph1-PP-S1). This connection establishing process is performed according to the Bluetooth standard.

In the present exemplary embodiment, an example is shown in which at the time of activation of the dedicated application, connection between the smart device 200 and the peripheral device 300 is established. However, in another exemplary embodiment, before the activation of the dedicated application, connection between the smart device 200 and the peripheral device 300 may be established (for example, only the connection establishment is performed by the system-side control). Also in such a case, in this state, the connection therebetween has merely been established and whether the peripheral device 300 can be used from the dedicated application is not known yet.

When the connection has been established between the smart device 200 and the peripheral device 300, a process of checking bonding information is executed, next (Ph1-SD-S2 and Ph1-PP-S2). Specifically, first, it is determined whether the state is "bonded state" or "non-bonded state". This determination is made by referring to the bonding information 213 in the smart device 200, and by referring to the bonding information 314 in the peripheral device 300 (for example, the determination can be made on the basis of whether BT_Addr of the communication counterpart has been stored). Then, the smart device 200 and the peripheral device 300 transmit/receive their own determination results to/from each other, whereby "bonded state" or "non-bonded state" is determined. As a result of this, when it has been determined that the state is "bonded state", determination of whether the valid period of the bonding information 314 has expired is further executed. This determination is made by referring to the valid period expiration flag 319 of the extended bonding information 316 in the peripheral device 300. Then, the data indicating the result thereof is transmitted from the peripheral device 300 to the smart device 200, whereby whether the valid period has expired can be grasped also on the smart device side.

As a result of the checking of the bonding information, when it has been determined that the state is "non-bonded state", or when it has been determined that the state is "bonded state" but the valid period thereof has expired, the subsequent processes are skipped and the process is advanced to the second phase process described later.

On the other hand, when the state is "bonded state" and the valid period thereof has not expired, the following process is executed. First, a request for transmitting the APP_ID 212 is sent from the peripheral device 300 to the smart device 200 (Ph1-PP-S3). In the smart device 200 having received this request, the APP_ID 212 is read out from the storage section and returned to the peripheral device 300 (Ph1-SD-S3). Next, in the peripheral device 300, a process of verifying the returned APP_ID 212 is executed (Ph1-PP-S4). This verification process is performed in the following manner. That is, in the peripheral device 300, when it is determined whether the APP_ID 317 stored in the nonvolatile memory 303 matches the returned APP_ID 212, and if the APP_ID 317 matches the APP_ID 212, it is determined that the verification has succeeded. It should be noted that the APP_ID 317 stored in the nonvolatile memory 303 is the one that has been stored in the nonvolatile memory 303 during the process procedure described below (in other words, when the authentication process has normally ended).

As a result of the verification of the APP_ID, if the verification has succeeded, it is determined that the authentication process using the authentication server 100 is not necessary. As a result, at this time point, the authentication process according to the present exemplary embodiment ends, and the peripheral device 300 is to be normally activated.

On the other hand, when the verification of the APP_ID on the peripheral device 300 has failed, a process for performing the authentication process using the authentication server 100 is executed. Specifically, a process of setting True to the valid period expiration flag 319 of the bonding information 314 is executed. That is, executed is a process of forcedly setting the bonding information into a state where the valid period has expired. Then, control of returning to the process of checking the bonding information (Ph1-SD-S2 and Ph1-PP-S2) is performed. As a result, it is determined that the valid period of the bonding information has expired, and the process is advanced to the second phase.

As the case where the verification of the APP_ID on the peripheral device 300 fails, the following cases are conceivable: the activation is the initial activation; the valid period of the bonding information has lapsed because connection has not been established for a predetermined time period; or an APP_ID different from the APP_ID 212 stored in the peripheral device 300 has been returned from the smart device 200. For example, it is assumed that, in a case where there are two different types of dedicated applications, i.e., dedicated application A, and dedicated application B, the dedicated application A is activated and the authentication process is performed once. As a result, the APP_ID of the dedicated application A is stored in the peripheral device 300. Then, when the dedicated application B is activated so as to establish connection with the peripheral device 300, the above different APP_ID is to be sent to the peripheral device 300. In such a case, the bonding information is forcedly set into a state where the valid period thereof has expired as described above, and then, the authentication process using the dedicated application B is newly executed. As a result, the APP_ID of the dedicated application B is to be stored in the peripheral device 300.

For example, also when, in order to use a function of the peripheral device 300, an access is tried from an application other than the dedicated application to the peripheral device 300 with which connection has been established, the peripheral device 300 cannot substantially be used as a result of the checking process of the APP_ID as described above. Such cases include, for examples: a case where an application other than the dedicated application cannot answer the request for transmitting the APP_ID 212 from the peripheral device 300; and a case where an APP_ID 212 is sent that does not match the APP_ID 317 stored in the nonvolatile memory 303 of the peripheral device 300, as described above.

Further, for example, in a case where the peripheral device 300 is not a genuine product, it is conceivable that, after the checking process of the bonding information, a request for transmitting the APP_ID 212 is not sent from the peripheral device 300 to the smart device 200 side. Thus, for example, in the dedicated application, after the checking process of the bonding information, if a transmission request for the APP_ID does not come from the peripheral device side after a predetermined time period has elapsed (i.e. time is out), it may be determined that the authentication has failed, and a predetermined process assuming failure may be executed.

Figure 12:
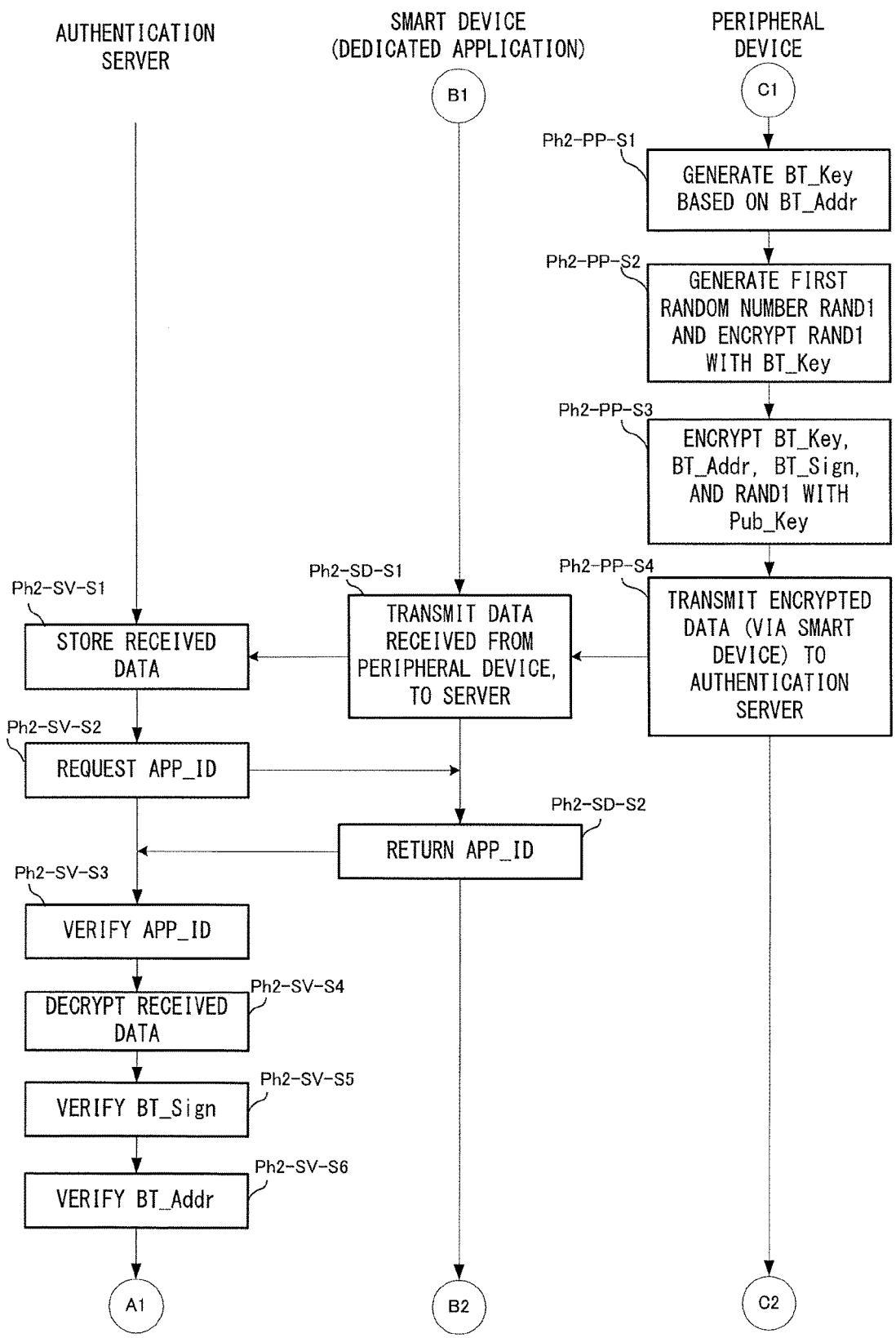
FIG. 12 is a flow chart showing details of a second phase process in the first exemplary embodiment.

Next, details of the second phase process will be described. FIG. 12 is a flow chart showing the details of the second phase process. In FIG. 12, the left flow indicates the flow of the process performed on the authentication server 100 side, the center flow indicates the flow of the process performed on the smart device (dedicated application) side, and the right flow indicates the flow of the process of the peripheral device 300 side. In this phase, a process of generating the BT_Key 318, and a process of verifying authenticity of the dedicated application and the peripheral device 300 on the authentication server 100 side are executed.

First, in the peripheral device 300, a process of generating a BT_Key 318 is executed (Ph2-PP-S1). Specifically, by using the BT_Addr 311 and a predetermined random number (a random number different from a first random number RAND1 or a second random number RAND2 described later), the BT_Key 318 is generated through a predetermined process to be stored in the nonvolatile memory 303. Examples of this predetermined process include a process of generating the BT_Key 318 by using an algorithm of so-called AES (Advanced Encryption Standard).

Next, in the peripheral device 300, a process of generating a first random number RAND1 is executed. Then, a process of encrypting the RAND1 by using the BT_Key 318 is executed (Ph2-PP-S2). It should be noted that "random number" here includes "pseudo random number" as well as "intrinsic random number". Since the BT_Key 318 is an AES key, the RAND1 is encrypted in accordance with the AES system.

Next, in the peripheral device 300, a process is executed in which the BT_Addr 311 and the BT_Sign 312 read out from the nonvolatile memory 303, the BT_Key 318 generated above, and the first random number RAND1 encrypted with the BT_Key 318 are encrypted with the Pub_Key 313 (Ph2-PP-S3).

Subsequently, in the peripheral device 300, a process is executed in which the BT_Addr 311, the BT_Sign 312, the BT_Key 318, and the first random number RAND1 that have been encrypted are transmitted to the smart device 200, with their transmission destination set to the authentication server 100 (Ph2-PP-S4).

Next, in the smart device 200, a process is executed in which: the above transmission destination is read; and the data received from the peripheral device 300 is transmitted (relayed) to the authentication server 100 (Ph2-SD-S1). That is, via the smart device 200, the BT_Addr 311, the BT_Sign 312, the BT_Key 318, and the first random number RAND1 that have been encrypted are transmitted from the peripheral device 300 to the authentication server 100.

Next, in the authentication server 100, a process is performed in which the respective pieces of data transmitted from the smart device 200 are received to be stored in the storage section 102 (Ph2-SV-S1).

Next, in the authentication server 100, a process of sending "Request for transmitting the APP_ID 212" to the smart device 200 (dedicated application) is executed (Ph2-SV-S2). In the smart device 200 having received this request, a process is executed in which the APP_ID 212 is read out from the storage section 204 to be returned to the authentication server 100 (Ph2-SD-S2). Next, in the authentication server 100, a process of verifying the returned APP_ID 212 is executed (Ph2-SV-S3). This verification process is performed in the following manner. That is, in the authentication server 100, the database 113 is searched for an application table 114 having the same name as the returned APP_ID 212. As a result, when an application table 114 having the same name is not found, it is determined that there is a possibility that the dedicated application currently serving as the communication counterpart is not an authentic dedicated application. As a result, it is considered that the verification has failed, and a predetermined process assuming a verification failure case is executed (for example, transmitting a predetermined error message to the smart device, etc.). The authentication process according to the present exemplary embodiment also ends at this time point.

On the other hand, when such an application table 114 has been found (verification of the APP_ID 212 has succeeded), then, in the authentication server 100, a process of decrypting the encrypted data received from the smart device 200 is executed (Ph2-SV-S4). Specifically, a process of decrypting each encrypted data with the Pvt_Key 112 is executed in the authentication server 100. It should be noted that the first random number RAND1 has been transmitted after having been encrypted with the BT_Key 318, and then further having been encrypted with the Pub_Key 313 (that is, encrypted twice). Therefore, at the time point of this decryption, the first random number RAND1 still encrypted with the BT_Key 318 is obtained.

Next, in the authentication server 100, a process of verifying the BT_Sign 312 obtained through the above decryption process is executed (Ph2-SV-S5). Specifically, in the authentication server 100, a process of verifying the BT_Sign 312 with the Vf_Key 111 is executed. Accordingly, it becomes possible to check whether the BT_Addr 311 has not been modified on the communication path, or whether the peripheral device 300 that is to serve as a communication counterpart is a genuine product. As a result of this verification, when the verification has failed, a predetermined process assuming a verification failure case is executed, and the authentication process according to the present exemplary embodiment also ends at this time point.

On the other hand, when the verification of the BT_Sign 312 has succeeded, then, in the authentication server 100, a process of verifying the BT_Addr 311 obtained through the above decryption is executed (Ph2-SV-S6). Specifically, in the authentication server 100, a process is executed in which the found application table 114 is searched for a BT_Addr 115 that matches the BT_Addr 311 obtained from the peripheral device 300. As a result, when such a BT_Addr 115 is not found, it is determined that there is a possibility that the peripheral device 300 is not a genuine product, and that the verification has failed. Then, a predetermined process assuming a verification failure case is executed. On the other hand, when a BT_Addr 115 that matches has been found, it is determined that verification has succeeded. At this time, although not shown, a predetermined message indicating that verification of the BT_Addr has succeeded may be transmitted from the authentication server 100 (via the smart device 200) to the peripheral device 300 (that is, success of verification may be notified of at this time point). Then, the procedure of the authentication process is advanced to the third phase process described below.

Figure 13:
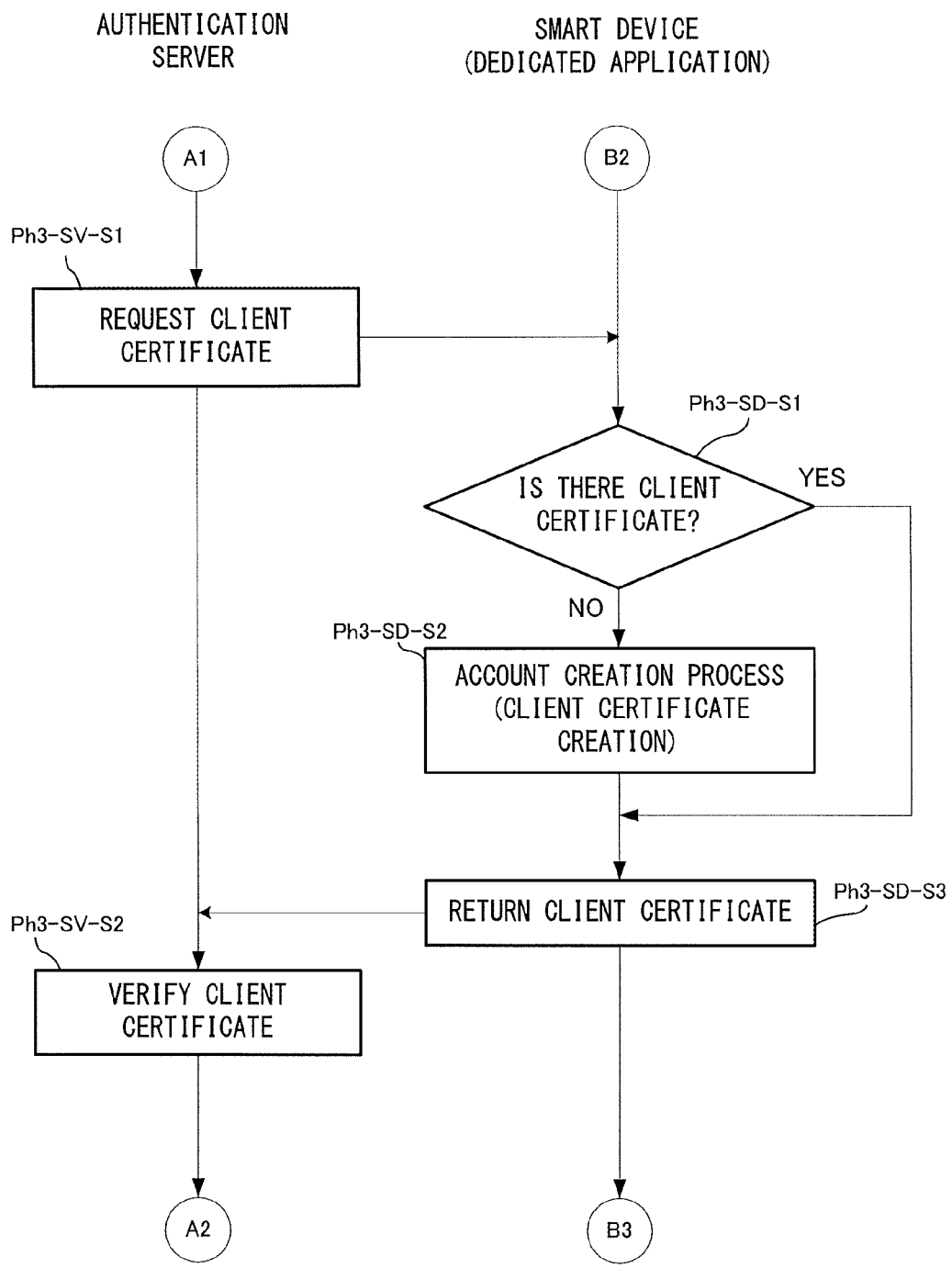
FIG. 13 is a flow chart showing details of a third phase process in the first exemplary embodiment.

Next, details of the third phase process will be described. FIG. 13 is a flow chart showing the details of the third phase process. In FIG. 13, the left flow indicates the flow of the process performed on the authentication server 100 side, and the right flow indicates the flow of the process performed on the smart device (dedicated application) side. In this phase, mainly, a process for verifying the client certificate of the smart device 200 is executed. That is, a process is executed in which, viewed from the authentication server 100, it is checked whether the smart device 200 that is to serve as the communication counterpart is a reliable communication counterpart.

In FIG. 13, first, a process is executed in which a request for a client certificate is transmitted from the authentication server 100 to the smart device 200 (Ph3-SV-S1). In the smart device 200 having received this request, first, it is determined whether the smart device 200 has the requested client certificate 214 (whether the requested client certificate 214 is stored) (Ph3-SD-S1). As a result, when the smart device 200 does not have the client certificate 214 (NO in Ph3-SD-S1), a process of creating a user account is executed (Ph3-SD-S2). For example, a screen for registering a user ID and a password necessary for using the dedicated application is displayed, and the user inputs a desired user ID and a desired password on the screen. These inputs are transmitted to the authentication server 100, and are registered, as appropriate, in an application table 114 as the user for the dedicated application. Then, by using a known technique, a client certificate is generated (the certificate authority in this generation is the authentication server 100, for example), and is stored as the client certificate 214 in the storage section 204.

On the other hand, when the smart device 200 already has the client certificate 214 (YES in Ph3-SD-S1), the above account creation process is not executed.

Next, in the smart device 200, a process of returning the client certificate 214 to the authentication server 100 is executed (Ph3-SD-S3). Subsequently, in the authentication server 100, by using a known technique, a process of verifying the client certificate 214 is executed (Ph3-SV-S2). For example, a process is executed in which a signature contained in the client certificate 214 (signature assigned to a client public key by the server having issued the client certificate) is verified with a public key of the server having issued the client certificate. When the verification of the client certificate has succeeded, the process is advanced to the fourth phase.

Figure 14:
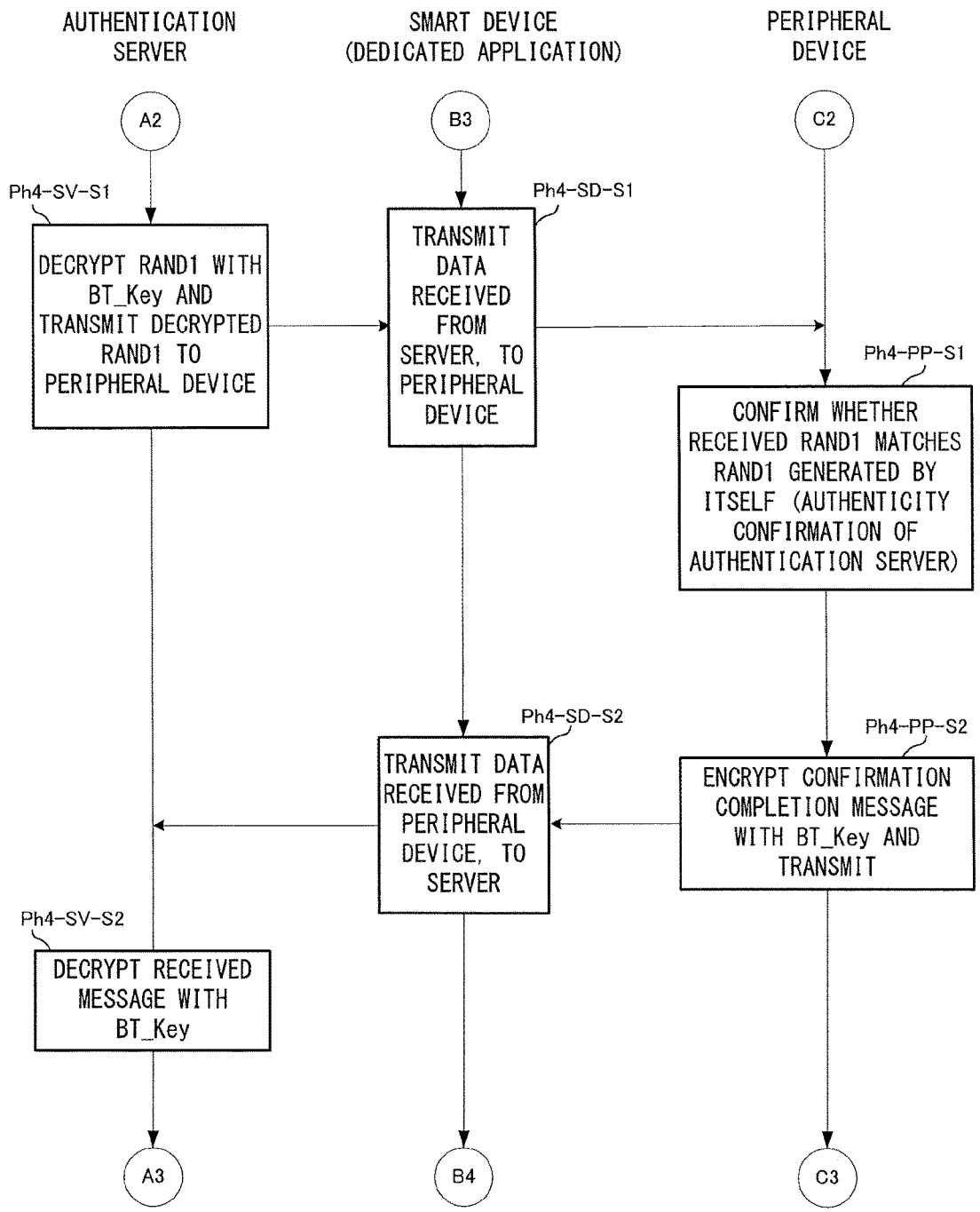
FIG. 14 is a flow chart showing details of a fourth phase process in the first exemplary embodiment.
Figure 15:
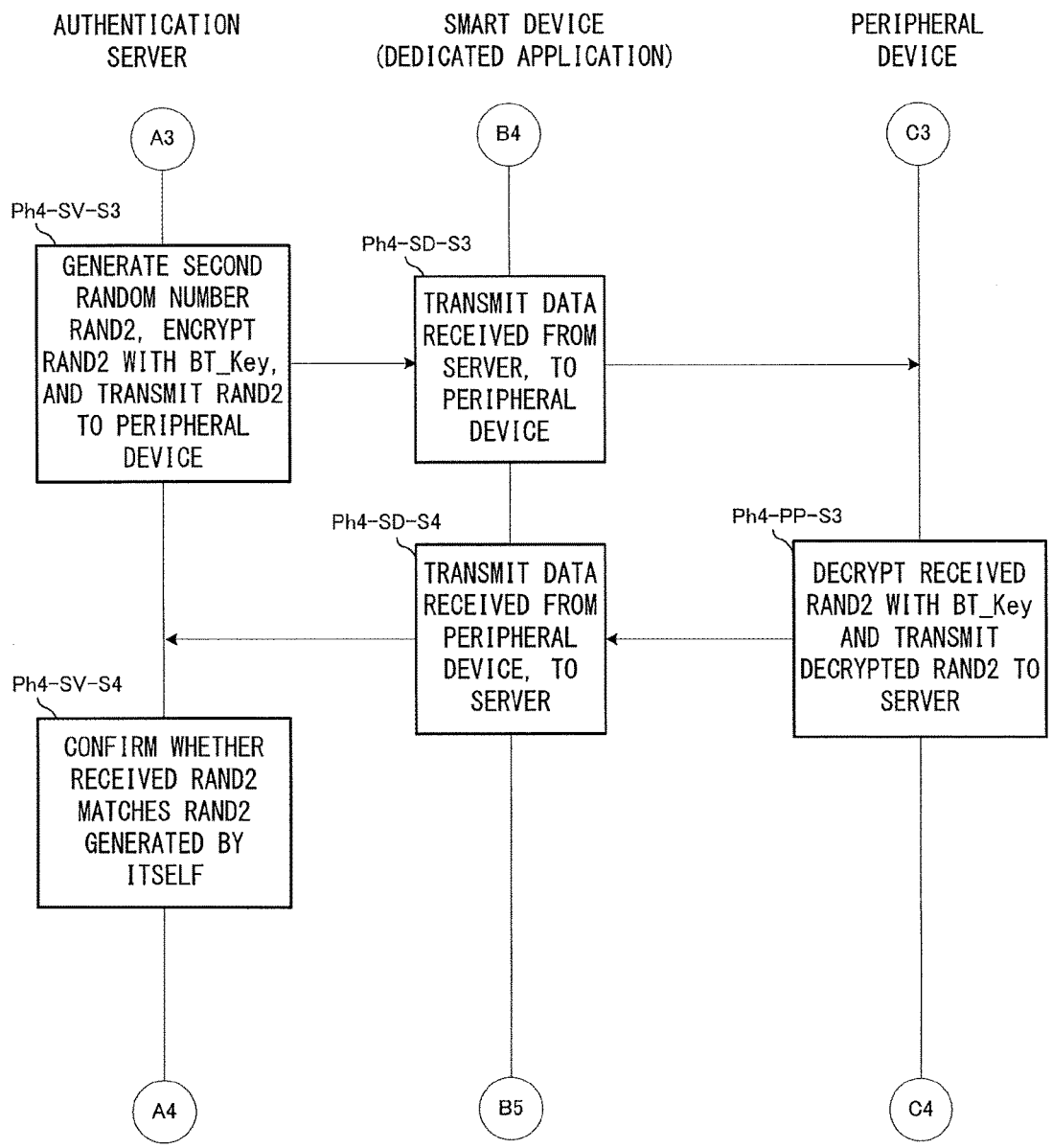
FIG. 15 is a flow chart showing details of the fourth phase process in the first exemplary embodiment.

Next, details of the fourth phase process will be described. FIG. 14 and FIG. 15 are flow charts showing the details of the fourth phase process. In FIG. 14 and FIG. 15, the left flow indicates the flow of the process performed on the authentication server 100 side, the center flow indicates the flow of the process performed on the smart device (dedicated application) side, and the right flow indicates the flow of the process performed on the peripheral device 300 side. In this phase, mainly between the authentication server 100 and the peripheral device 300, a process of confirming whether they are reliable communication counterparts with each other is performed.

First, a process is executed in which, viewed from the peripheral device side, it is checked whether the authentication server 100 is a reliable counterpart as a counterpart with which to perform encrypted communication (authenticity of the authentication server 100 as an encrypted communication counterpart). Specifically, first, in the authentication server 100, a process is executed in which the first random number RAND1 (still being encrypted with the BT_Key 318 at that time point) obtained in the second phase process above (process of Ph2-SV-S4) is decrypted with the BT_Key also obtained in the second phase process. As a result, the first random number RAND1 that is not encrypted is obtained. Then, a process of transmitting this RAND1 to (the peripheral device 300 via) the smart device 200 is executed (Ph4-SV-S1). That is, the RAND1 is transmitted to the smart device 200, with the peripheral device 300 set as the transmission destination.

Next, in the smart device 200, a process is executed in which the above destination is read and the data received from the authentication server 100 is transmitted to the peripheral device 300 (Ph4-SD-S1).

Next, in the peripheral device 300, a process is executed in which whether the RAND1 sent from the authentication server via the smart device 200 matches the RAND1 generated by the peripheral device 300 (see Ph2-PP-S2 above) is confirmed (Ph4-PP-S1). When these RAND1s do not match each other, it is considered that authenticity of the authentication server 100 has not been confirmed, and a predetermined process assuming failure of the confirmation is performed. On the other hand, when these RAND1s match each other, then, in the peripheral device 300, a predetermined message indicating completion of the confirmation process using the first random number RAND1 is generated. Here, the predetermined message also serves as a message indicating a transmission request for (request for issuance of) the second random number RAND2 described later, from the peripheral device 300 to the authentication server 100. Then, in the peripheral device 300, a process of encrypting the predetermined message with the BT_Key 318 is executed. Then, a process is executed in which the encrypted message is transmitted to the smart device 200, with the transmission destination thereof set to the authentication server 100 (Ph4-PP-S2). In the smart device 200, a process is executed in which the message received from the peripheral device 300 is transmitted to the authentication server 100 (Ph4-SD-S2).

Next, in the authentication server 100, a process is executed in which the encrypted message relayed from the smart device 200 is received to be decrypted with the BT_Key obtained through the second phase process (Ph4-SV-S2). Accordingly, in the authentication server 100, it is possible to grasp that the process of checking authenticity of the authentication server 100 as the encrypted communication counterpart for the peripheral device 300 has been completed. Then, a process is executed in which, viewed from the authentication server 100, it is checked whether the peripheral device 300 is a reliable counterpart as a counterpart with which to perform encrypted communication (authenticity of the peripheral device 300 as an encrypted communication counterpart).

First, in the authentication server 100, a second random number RAND2 is generated. Then, the RAND2 is encrypted with the BT_Key obtained through the second phase process. Further, a process is executed in which the encrypted second random number RAND2 (hereinafter, encrypted RAND2) is transmitted to the smart device 200, with the transmission destination thereof set to the peripheral device 300 (Ph4-SV-S3). In the smart device 200, a process is executed in which the destination is read and the encrypted RAND2 received from the authentication server 100 is transmitted to the peripheral device 300 (Ph4-SD-S3).

Next, in the peripheral device 300, a process is executed in which the received encrypted RAND2 is decrypted with the BT_Key 318. Then, a process is executed in which the decrypted RAND2 is transmitted to the smart device 200, with the transmission destination thereof set to the authentication server 100 (Ph4-PP-S3). In the smart device 200, a process is executed in which the RAND2 received from the peripheral device 300 is transmitted to the authentication server 100 (Ph4-SD-S4).

Next, in the authentication server 100, a process is executed in which whether the second random number RAND2 received from the smart device 200 matches the above-generated second random number RAND2 is confirmed (Ph4-SV-S4). When these RAND2s do not match each other, it is considered that authenticity of the peripheral device 300 has not been confirmed, and a predetermined process assuming failure of the confirmation is executed. On the other hand, when these RAND2s match each other, it means that the authentication server 100 and the peripheral device 300 have confirmed that they are reliable as encrypted communication counterparts with each other. Accordingly, the process is advanced to the fifth phase process.

Figure 16:
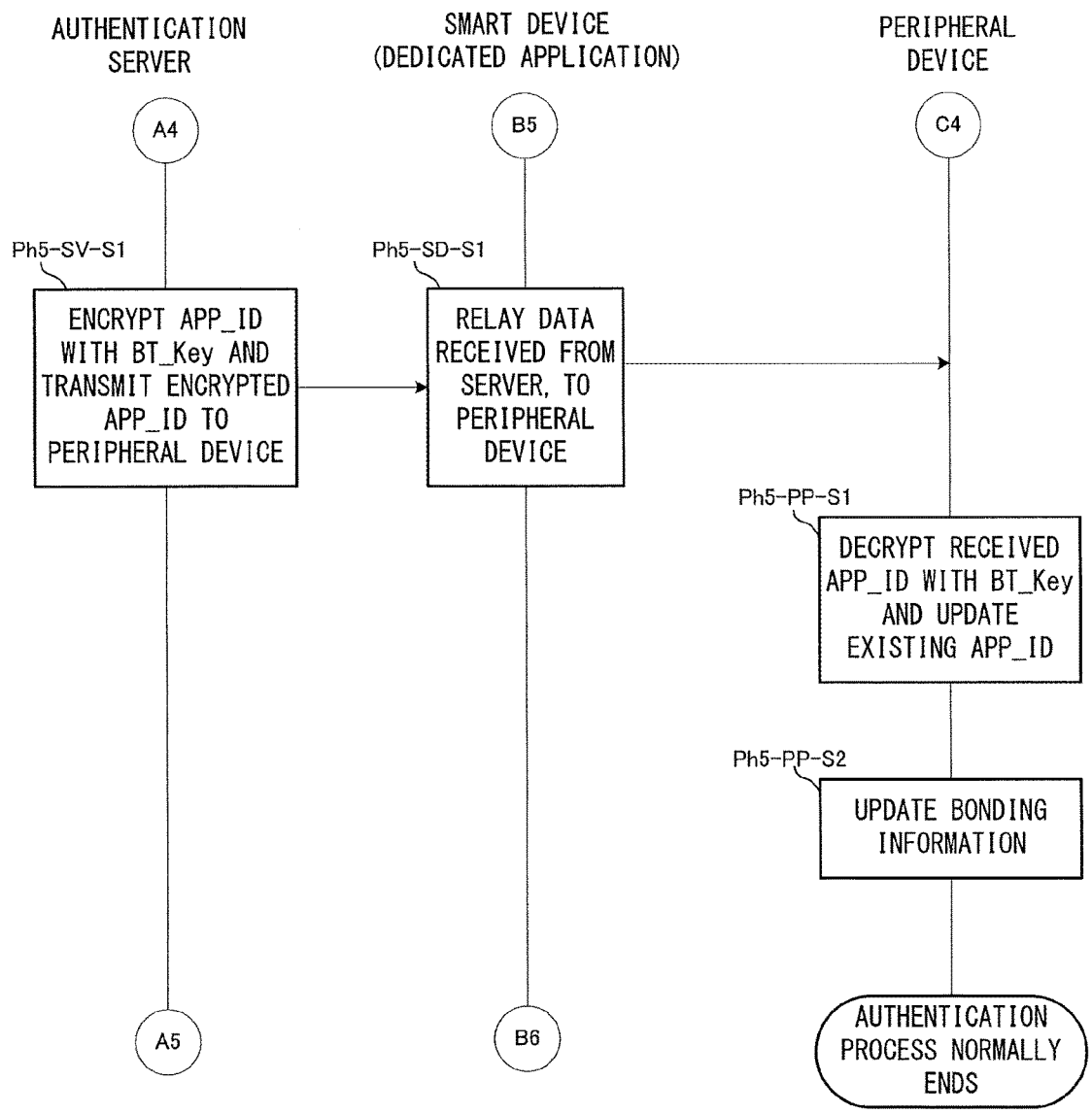
FIG. 16 is a flow chart showing details of a fifth phase process in the first exemplary embodiment.

Next, details of the fifth phase process will be described. FIG. 16 is a flow chart showing the details of the fifth phase process. In FIG. 16, the left flow indicates the flow of the process performed on the authentication server 100 side, the center flow indicates the flow of the process performed on the smart device (dedicated application) side, and the right flow indicates the flow of the process performed on the peripheral device 300. In this phase, a process of registering or updating the APP_ID 317 in the peripheral device, and the like are executed (as a result, at the next activation of the dedicated application, for example, this APP_ID 317 is used in the first phase process described above).

First, in the authentication server 100, a process is executed in which the APP_ID obtained in the second phase process from the smart device is encrypted with the BT_Key obtained also in the second phase process from the peripheral device 300. Then, a process is executed in which the encrypted APP_ID (hereinafter, encrypted APP_ID) is transmitted via the smart device 200 to the peripheral device 300 (Ph5-SV-S1). In the smart device 200, a process is executed in which the encrypted APP_ID received from the authentication server 100 is transmitted to the peripheral device 300 (Ph5-SD-S1).

In the peripheral device 300, a process is executed in which the received encrypted APP_ID is decrypted with the BT_Key 318 (Ph5-PP-S1). Then, a process is executed in which the APP_ID 317 stored in the nonvolatile memory 303 is updated with the decrypted APP_ID. When an APP_ID 317 has not yet been stored in the nonvolatile memory 303 (such as when the initial activation or the like), this is newly stored. Accordingly, the latest APP_ID 317 is stored in the peripheral device 300. For example, the following case is assumed in which the version of the dedicated application has been upgraded and the APP_ID is also assigned with a new one. In such a case, since the APP_ID of the latest version is stored in the peripheral device 300, the peripheral device 300 can no longer be used via the dedicated application of the older version (in such a case, in the first phase process, a message that would urges version-up of the dedicated application may be displayed on the smart device 200 side).

Next, in the peripheral device 300, executed is a process for updating the bonding information 314 so as to realize a state where the authentication process using the authentication server 100 is not required when the dedicated application is activated next time and thereafter (Ph5-PP-S2). That is, a process is executed in which the content of the basic bonding information 315 is updated as appropriate and in which the valid period expiration flag 319 in the extended bonding information 316 is updated to False. In addition, a value for counting the valid period is set as appropriate to the valid period counter 320. Then, the authentication process in the peripheral device 300 ends.

Figure 17:
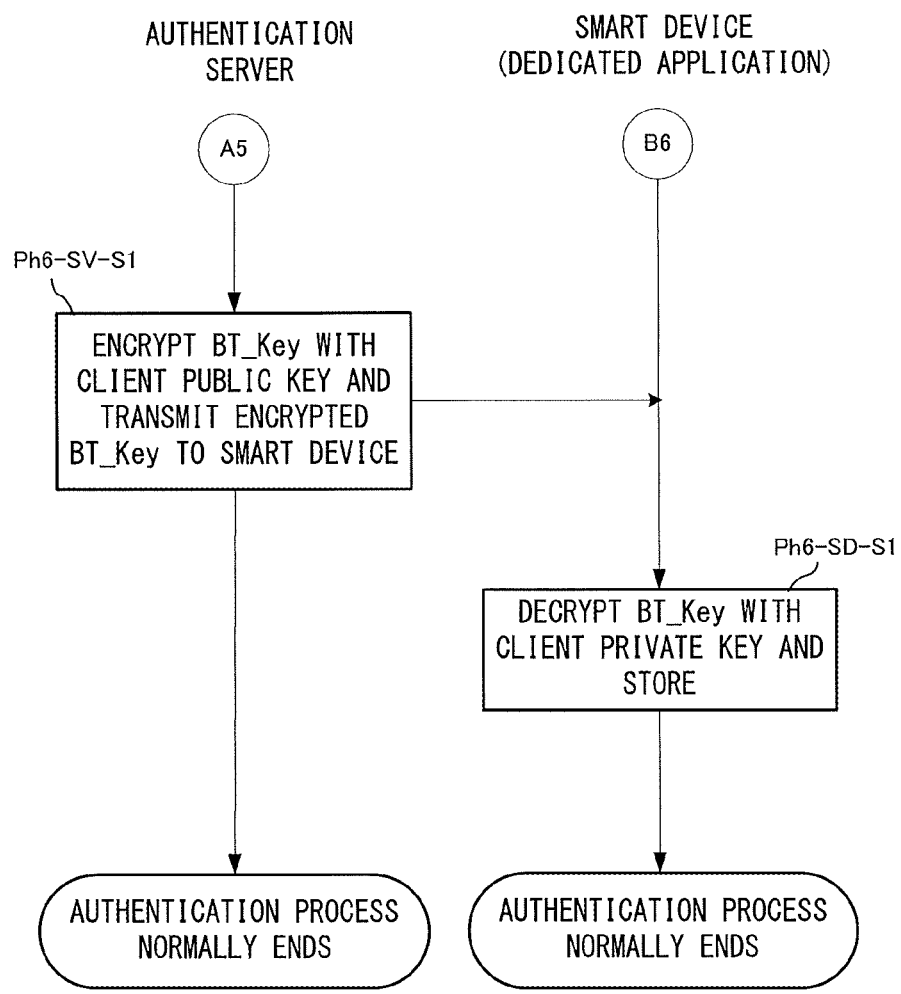
FIG. 17 is a flow chart showing details of a sixth phase process in the first exemplary embodiment.

Next details of the sixth phase process will be described. FIG. 17 is a flow chart showing the details of the sixth phase process. In FIG. 17, the left flow indicates the flow of the process performed on the authentication server 100 side, and the right flow indicates the flow of the process performed on the smart device (dedicated application) side. In this phase, a process is executed in which the BT_Key being the key for encrypted communication is transmitted from the authentication server 100 to the smart device 200. That is, first, in the authentication server 100, a process is executed in which the BT_Key obtained from the peripheral device 300 in the second phase process is encrypted with a client public key. This client public key is contained in the client certificate obtained in the third phase process. Then, in the authentication server 100, a process of transmitting the encrypted BT_Key to the smart device 200 is executed (Ph6-SV-S1).

Next, in the smart device 200, the encrypted BT_Key is received. Then, a process is executed in which the BT_Key is decrypted with the private key (key that is paired with the client public key) generated when the client certificate has been issued to the smart device 200 (Ph6-SD-S1). Then, in the smart device 200, the decrypted BT_Key is stored in the storage section 204 as the BT_Key 215.

Then, the authentication process in the authentication server 100 and the smart device 200 also ends. After this, the peripheral device 300 is normally activated, and the communication between the dedicated application and the peripheral device 300 is to be encrypted with the BT_Key. Encryption using this BT_Key is performed until the authentication process as described above is executed next time (that is, until the authentication process is executed next time, this BT_Key is used in encryption). Further, in the present exemplary embodiment, encryption based on the Bluetooth standard (for example, LTK: Long Term Key, etc.) is also performed. For example, various types of data used in the dedicated application are encrypted with the BT_Key. These pieces of data are caused to be included in a packet appropriate for transmission/reception, and this packet is encrypted based on the Bluetooth standard and then transmitted/received. That is, the communication between the dedicated application and the peripheral device 300 is in the double encryption, i.e., the encryption using the BT_Key and the encryption in accordance with the Bluetooth standard. Thus, even if the encryption in accordance with the Bluetooth standard is tapped, encryption using the BT_Key is valid, and thus, tapping of data can be prevented in a secured manner.

As described above, in the present exemplary embodiment, authentication of the peripheral device communicable with the smart device is performed. In the authentication process, the authentication server 100 is used. Further, although the smart device is interposed between the peripheral device 300 and the authentication server 100, the smart device does not directly perform the authentication process. Accordingly, the peripheral device 300 can execute the authentication process in a secure environment irrespective of the kind of the smart device as long as the dedicated application is installed therein.

In the present exemplary embodiment, the bonding information stored in the peripheral device is provided with a valid period. Accordingly, within the valid period, convenience for the user can be enhanced, and at the timing of expiration of the valid period, the authentication process can be executed again. That is, convenience for the user and checking of authenticity of the peripheral device and the dedicated application can both be realized.

Second Exemplary Embodiment

Next, a second exemplary embodiment will be described. In the second exemplary embodiment, a case where a so-called secure memory (memory having a secure region) is used as a data storage section in the peripheral device will be described. The secure memory is configured such that data stored in the secure memory can be accessed only by a component inside the peripheral device, such as the microcomputer 302. From outside the peripheral device, data stored in the secure memory cannot be accessed. For example, another information processing device being in wireless or wired connection with the peripheral device cannot access data stored in the secure memory.

The overall configuration of the authentication system according to the second exemplary embodiment is basically the same as the system configuration shown in FIG. 1 in the first exemplary embodiment. The hardware configurations of the authentication server 100 and the smart device 200 are the same as those in the first exemplary embodiment. Thus, detailed description thereof is omitted. On the other hand, the peripheral device is different from that in the first exemplary embodiment in that a secure memory as described above is provided.

Figure 18:
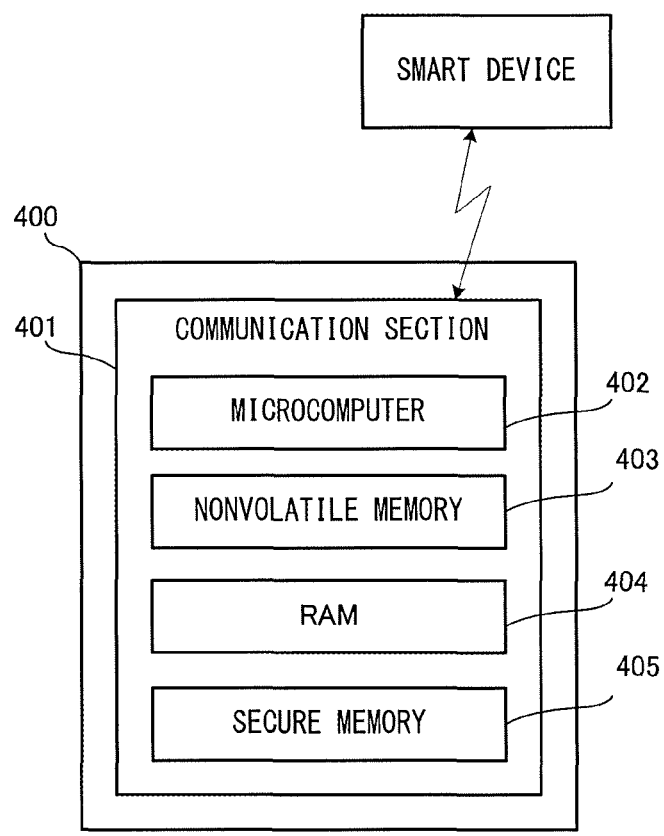
FIG. 18 is a schematic diagram showing a hardware configuration of a peripheral device 400 according to a second exemplary embodiment.

FIG. 18 is a schematic diagram showing a hardware configuration of a peripheral device 400 according to the second exemplary embodiment. The peripheral device 400 includes a communication section 401. Although not shown, the peripheral device 400 also includes various types of hardware components, such as operation buttons and various types of sensors, that are necessary for executing the dedicated applications. The communication section 401 is a communication chip, for example, and has a function of performing wireless communication with the smart device 200. The communication section 401 includes a microcomputer 402, a nonvolatile memory 403, a RAM 404, and secure memory 405. In the nonvolatile memory 403, program data for executing processes and described later is stored. This program is to be executed by the microcomputer 402. Various types of data necessary in the processing described later are stored in the RAM 404 as appropriate. The secure memory 405 is a memory to which access is limited as described above. In the present exemplary embodiment, it is assumed that only the microcomputer 402 can access data stored in the secure memory 405.

Next, the outline of the authentication process to be executed in the second exemplary embodiment will be described. Basically, in the second exemplary embodiment, the process having the same purpose of the first exemplary embodiment is executed. Thus, a part of the authentication process is common with the first exemplary embodiment.

On the other hand, a part of data used in the authentication process is stored in the secure memory 405. The data stored in the secure memory 405 can be considered to have high reliability. Thus, in the second exemplary embodiment, on the basis of the high reliability, a part of the authentication process is made different from that of the first exemplary embodiment.

Figure 19:
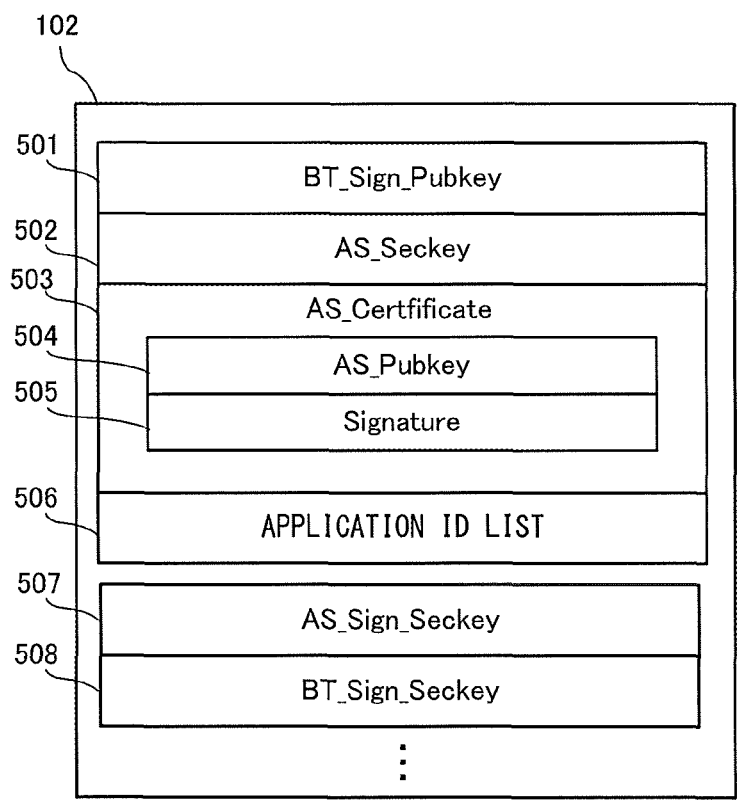
FIG. 19 shows data stored in the storage section 102 of the authentication server 100 in the second exemplary embodiment

Next, various types of data to be used in processes according to the second exemplary embodiment will be described. First, data stored in the authentication server 100 will be described. FIG. 19 shows data stored in the storage section 102 of the authentication server 100. In the storage section 102, a BT_Sign_Pubkey 501, an AS_Seckey 502, an AS_Certificate 503, and an application ID list 506 are stored. Further, in the storage section 102, an AS_Sign_Seckey 507 and a BT_Sign_Seckey 508 are stored.

The BT_Sign_Pubkey 501 is key data for verifying a BT_Certificate 603 stored in the peripheral device 400 described later. The BT_Sign_Pubkey 501 is also a public key paired with the BT_Sign_Seckey 508 (private key) described later.

The AS_Seckey 502 is a private key of the authentication server 100. The AS_Certificate 503 is certificate data of the authentication server 100. The AS_Certificate 503 is composed of an AS_Pubkey 504 and a Signature 505. The AS_Pubkey 504 is a public key paired with the AS_Seckey 502. The Signature 505 is a so-called digital signature. Specifically, the Signature 505 is obtained by calculating a hash of the AS_Pubkey 504 and encrypting the calculated hash by use of the AS_Sign_Seckey 507 described later. That is, the AS_Certificate 503 is composed of the AS_Pubkey 504 before being encrypted and the AS_Pubkey 504 (=Signature 505) having been encrypted.

The application ID list 506 is list data of application IDs of dedicated applications. When a plurality of dedicated applications have been released, the application ID of the latest version of each dedicated application is stored in the list.

The AS_Sign_Seckey 507 and the BT_Sign_Seckey 508 are data for causing the authentication server 100 to function as a so-called "certificate authority". In the present exemplary embodiment, for convenience of explanation, an example is shown in which these pieces of data are stored in the authentication server 100. However, in another exemplary embodiment, a server or the like that functions as the "certificate authority" may be separately provided. In such a case, it is sufficient that the device that functions as the "certificate authority" is caused to have the AS_Sign_Seckey 507 and the BT_Sign_Seckey 508 stored therein.

The AS_Sign_Seckey 507 is a signature key of the authentication server. That is, the AS_Sign_Seckey 507 is a signature key to be used when generating the Signature 505 of the AS_Certificate 503. The BT_Sign_Seckey 508 is a signature key of the peripheral device 400. The BT_Sign_Seckey 508 is also a signature key to be used when generating a Signature 605 of the BT_Certificate 603 described later.

Figure 20:
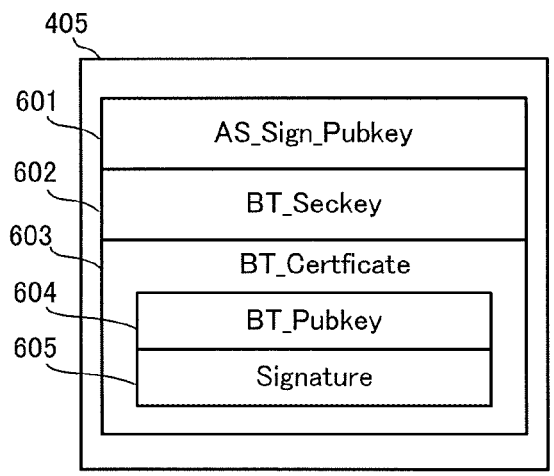
FIG. 20 shows data stored in a secure memory 405 of the peripheral device 400.
Figure 21:
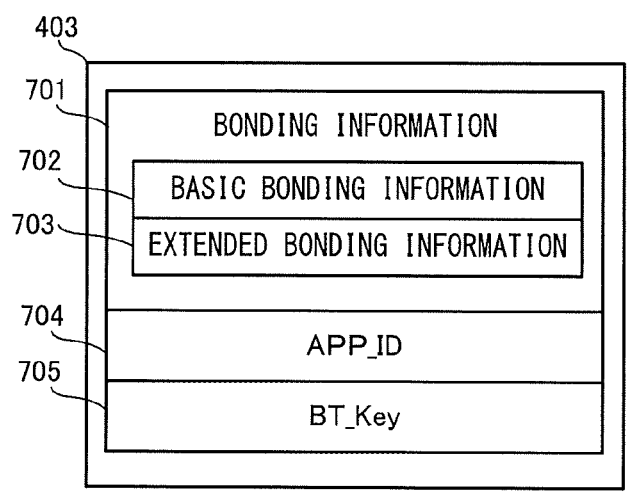
FIG. 21 shows data stored in a nonvolatile memory 403 of the peripheral device 400.

Next, data stored in the peripheral device 400 will be described. FIG. 20 and FIG. 21 show data stored in the peripheral device 400. First, with reference to FIG. 20, data stored in the secure memory 405 will be described. In the secure memory 405, an AS_Sign_Pubkey 601, a BT_Seckey 602, and the BT_Certificate 603 are stored. These pieces of data are stored in the secure memory 405, and thus, the reliability thereof is considered to be high (modification risk is low, etc.).

The AS_Sign_Pubkey 601 is key data for verifying the certificate of the authentication server 100, i.e., the AS_Certificate 503. The AS_Sign_Pubkey 601 is also a public key paired with the AS_Sign_Seckey 507 (private key). The BT_Seckey 602 is a private key of the peripheral device 400. The BT_Certificate 603 is certificate data of the peripheral device 400. The BT_Certificate 603 is composed of a BT_Pubkey 604 and the Signature 605. The BT_Pubkey 604 is a public key paired with the BT_Seckey 602. The Signature 605 is a digital signature, and is obtained by calculating a hash of the BT_Pubkey 604 and encrypting the calculated hash by use of the BT_Sign_Seckey 508. That is, the BT_Certificate 603 is composed of the BT_Pubkey 604 before being encrypted and the BT_Pubkey 604 (=Signature 605) having been encrypted.

Next, with reference to FIG. 21, data stored in the nonvolatile memory 403 of the peripheral device 400 will be described. In the nonvolatile memory 403, bonding information 701, an APP_ID 704, a BT_Key 705, and the like are stored. The contents of these pieces of data are the same as those of the bonding information 314, the APP_ID 317, and the BT_Key 318 in the first exemplary embodiment described above, and thus, description thereof is omitted here.

Data stored in the smart device 200 in the second exemplary embodiment is basically the same as that stored in the first exemplary embodiment described above (see FIG. 9). Therefore, detailed description of data stored in the smart device 200 is also omitted. However, as the dedicated application program 211, a program for executing the processes described below is stored. That is, the dedicated application program 211 having functions that are slightly different from those in the first exemplary embodiment is stored.

Next, the flow of the authentication process according to the second exemplary embodiment will be described. For convenience of explanation, in the following, the authentication process is divided into some "phases" to be explained. First, with reference to FIG. 22, the overview of the flow of the authentication process according to the second exemplary embodiment and the outline of the process performed in each phase will be described. Then, details of the process in each phase will be described.

Figure 22:
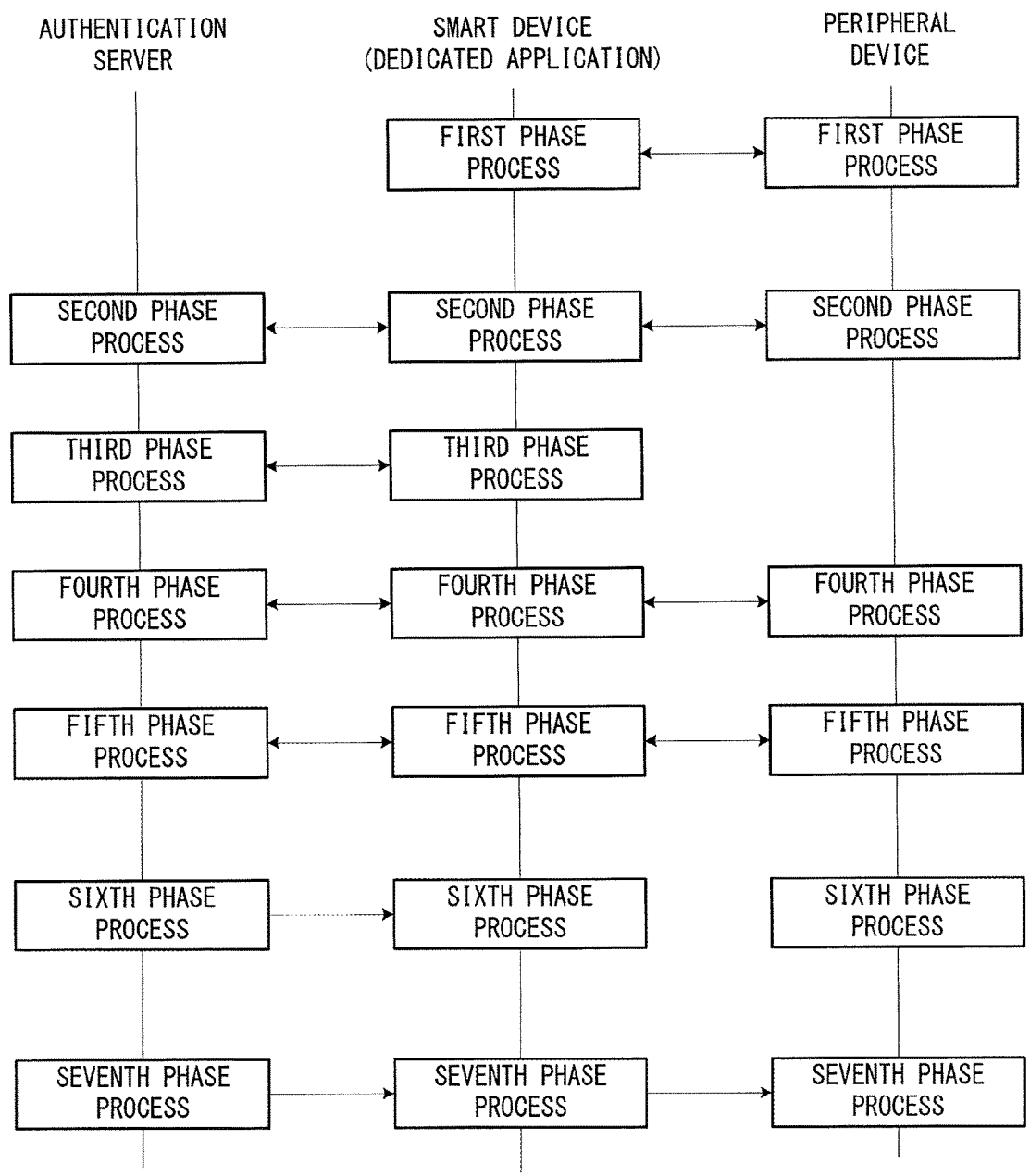
FIG. 22 is a diagram for explaining the outline of an authentication process in the second exemplary embodiment.

In FIG. 22, process phases are shown in the order of, from left, the authentication server 100, the smart device 200, and the peripheral device 400. The phases are arranged in time series in the vertical direction. Each arrow in the horizontal direction shows that transmission/reception of data is performed.

First, the outline of a first phase process will be described. In this phase, the process that is the same as the first phase process in the first exemplary embodiment described above is performed. That is, a process of establishing connection between the smart device 200 (dedicated application) and the peripheral device 400, a process of determining necessity of the authentication process involving communication with the authentication server 100, and the like are executed.

Next, the outline of a second phase process will be described. The process in this phase is performed among three parties, i.e., the authentication server 100, the smart device 200, and the peripheral device 400. Mainly, in this phase, a process is executed in which authenticity of the peripheral device 400 is determined by verifying the certificate of the peripheral device 400 in the authentication server 100.

Next, the outline of a third phase process will be described. The process in this phase is performed between the authentication server 100 and the smart device 200. In this phase, mainly, in the authentication server 100, a process of checking the application ID of the dedicated application and a process of verifying the client certificate are executed.

Next, the outline of a fourth phase process will be described. The process in this phase is performed among the three parties, i.e., the authentication server 100, the smart device 200, and the peripheral device 400. However, the smart device 200 mainly serves as a relaying device, and transmission/reception is performed substantially between the authentication server 100 and the peripheral device 400. In this phase, mainly, a process of verifying the certificate of the authentication server 100 is executed on the peripheral device 400 side.

Next, the outline of a fifth phase process will be described. The process in this phase is performed among the three parties, i.e., the authentication server 100, the smart device 200, and the peripheral device 400. However, also here, the smart device 200 mainly serves a relaying device, and transmission/reception is performed substantially between the authentication server 100 and the peripheral device 400. In this phase, mainly, a process is executed in which pieces of data (first random number RAND1 and second random number RAND2 described later) necessary for generating a common key for encrypted communication are exchanged, between the authentication server 100 and the peripheral device 400.

Next, the outline of a sixth phase process will be described. In this phase, mainly, in the authentication server, a process of generating a common key to be used in encrypted communication and transmitting the common key to the smart device 200 is executed, and also on the peripheral device 400 side, a process of generating the common key is executed.

Next, the outline of a seventh phase process will be described. In this phase, mainly, a setting process is executed so as to allow the authentication process of the next time and thereafter to be skipped.

Hereinafter, details of the process in each phase will be described. In the description below, each process shown in the drawing (flow chart) is assigned with a reference sign. The naming convention for the reference signs are in accordance with that in the first exemplary embodiment, but step numbers are expressed in triple-digit numbers to be differentiated from those in the first exemplary embodiment.

Similarly to the first exemplary embodiment, it is assumed that, prior to the start of the processes, the peripheral device 400 is in a state of being energized, and also, the smart device 200 is in a state of being able to perform Internet communication (a state in which the smart device 200 can communicate with the authentication server 100). In this state, when the above-described dedicated application is activated in the smart device 200, the process described below is started.

With respect to the execution entity of each process, as in the first exemplary embodiment, the processing section 101 serves as the execution entity for the authentication server 100, the processing section 201 serves as the execution entity for the smart device 200, and the microcomputer 402 serves as the execution entity for the peripheral device 400.

First, the first phase process according to the second exemplary embodiment will be described. In this phase, the process that is the same as the first phase process according to the first exemplary embodiment is executed. That is, a process of establishing connection between the smart device 200 and the peripheral device 400, a process of determining necessity of the authentication process using the authentication server 100, and the like are executed. When it has been determined that the authentication process using the authentication server 100 is not necessary, the peripheral device 300 is normally activated. When it has been determined that the authentication process using the authentication server 100 is necessary, the process is advanced to the second phase process. The contents of the process in the first phase are the same as those in the first phase in the first exemplary embodiment having been described with reference to FIG. 11, and thus, detailed description thereof is omitted here.

Figure 23:
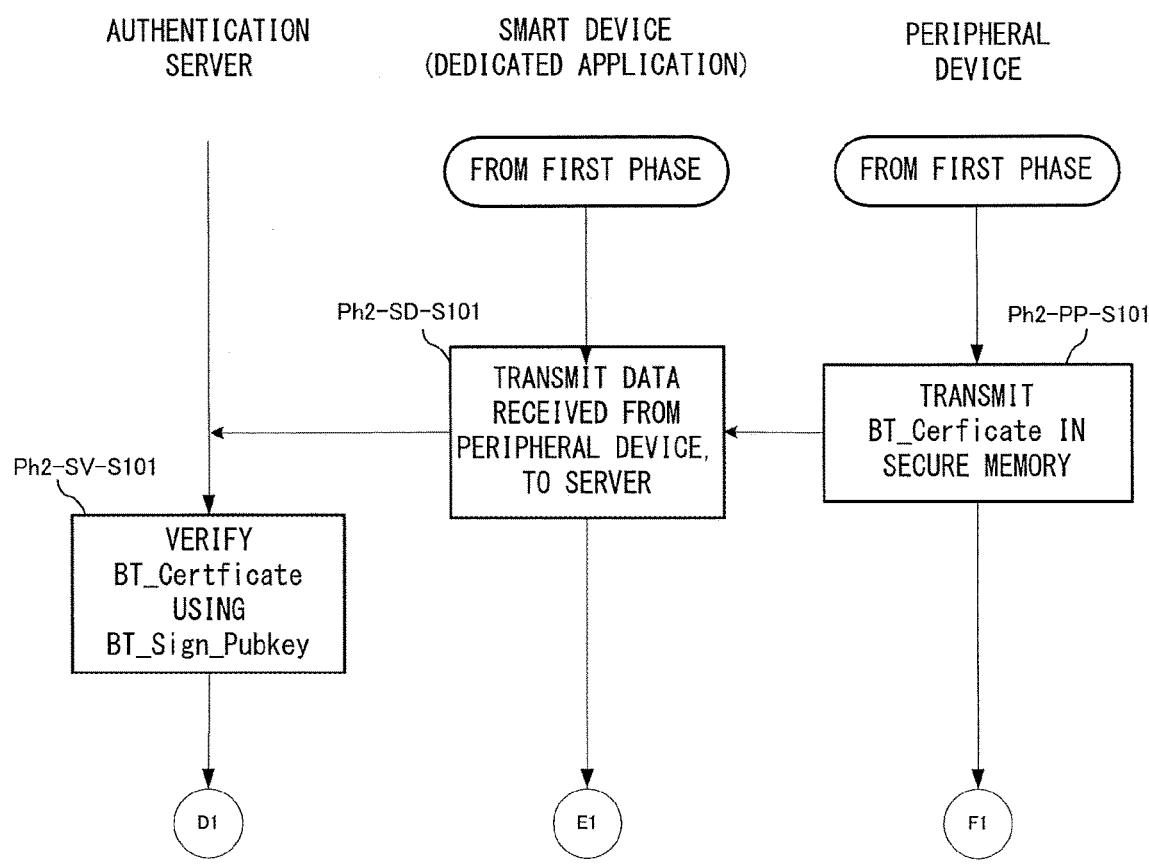
FIG. 23 is a flow chart showing details of a second phase process in the second exemplary embodiment.

Next, details of the second phase process in the second exemplary embodiment will be described. FIG. 23 is a flow chart showing the details of the second phase process according to the second exemplary embodiment. In this phase, a process for confirming authenticity of the peripheral device 400 is executed in the authentication server 100. First, in the peripheral device 400, the BT_Certificate 603 is read out from the secure memory 405. Then, a process of transmitting the read BT_Certificate 603 to the smart device 200 is executed (Ph2-PP-S101). Next, in the smart device 200, a process is executed in which the BT_Certificate 603 received from the peripheral device 400 is transmitted to the authentication server 100 (Ph2-SD-S101).

Next, in the authentication server 100, a process is executed in which the BT_Certificate 603 received from the smart device 200 is verified by use of the BT_Sign_Pubkey 501. Specifically, the Signature 605 contained in the BT_Certificate 603 is decrypted, and it is determined whether the value obtained through the decryption of the Signature 605 matches the hash value of the BT_Pubkey 604. When they match each other, it means that the verification has succeeded. Since the BT_Certificate 603 is to be used in a process executed later, the BT_Certificate 603 is stored in the storage section 102. On the other hand, when they do not match each other, it means that verification has failed. In this case, a predetermined process assuming a verification failure case is executed, and the authentication process according to the present exemplary embodiment also ends at this time point.

Figure 24:
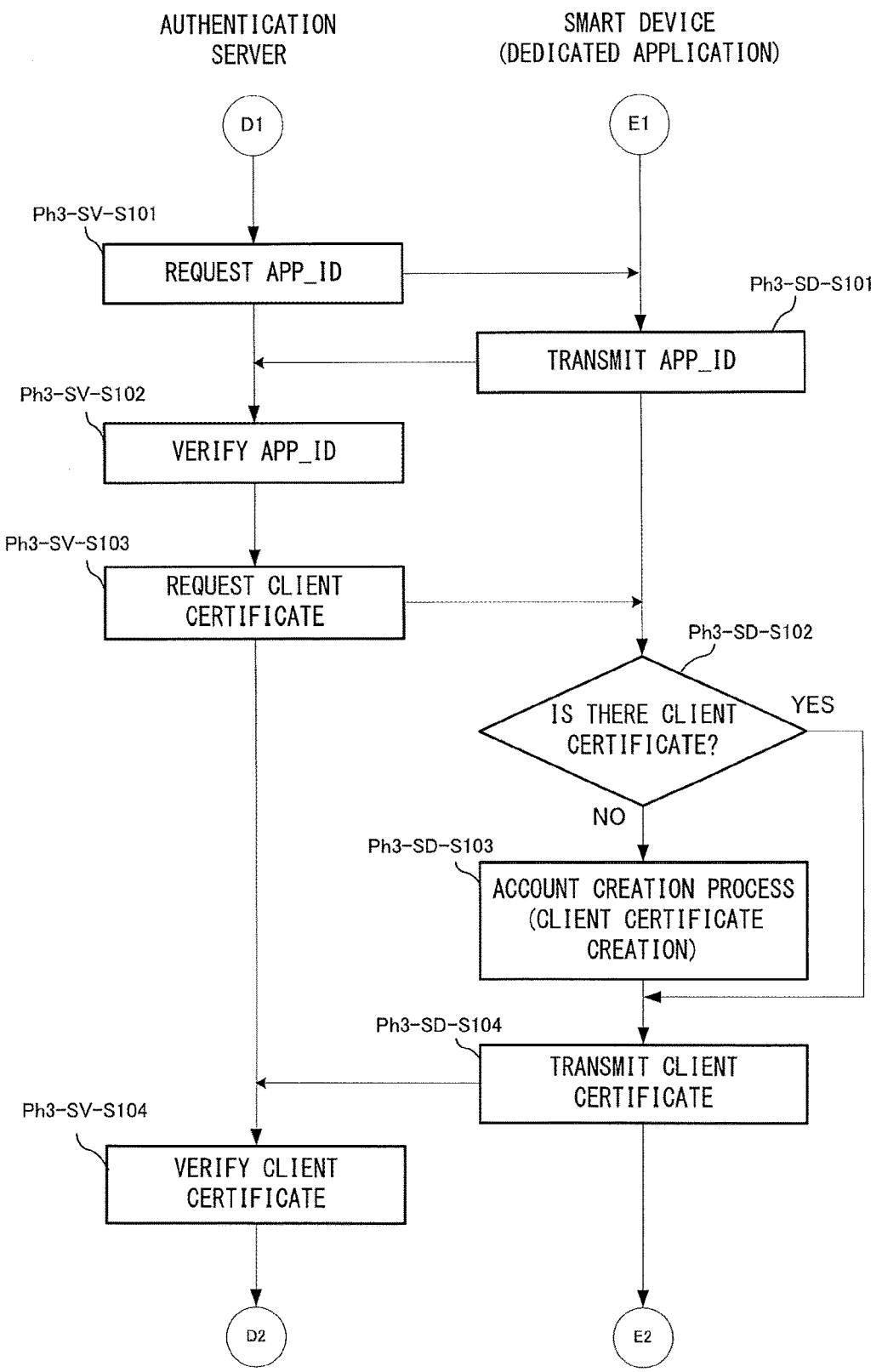
FIG. 24 is a flow chart showing details of a third phase process in the second exemplary embodiment.

Next, details of the third phase process will be described. Here, mainly, a process of performing verification of the smart device 200 is executed. FIG. 24 is a flow chart showing the details of the third phase process according to the second exemplary embodiment. First, in the authentication server 100, a process is executed in which a request for transmitting the APP_ID 212 that corresponds to the dedicated application is sent to the smart device 200 (dedicated application). In the smart device 200 having received this request, a process is executed in which the APP_ID 212 is read out from the storage section 204 to be returned to the authentication server 100 (Ph2-SD-S 102).

Next, in the authentication server 100, a process of verifying the APP_ID 212 sent from the smart device 200 is executed (Ph2-SV-S3). This verification process is performed in the following manner. That is, in the authentication server 100, a process is executed in which the application ID list 506 is searched for the returned APP_ID 212. As a result, when the APP_ID 212 is not found, it is determined that there is a possibility that the dedicated application currently serving as the communication counterpart is not an authentic dedicated application. As a result, it is considered that the verification has failed, and a predetermined process assuming a verification failure case is executed (for example, transmitting a predetermined error message to the smart device, etc.). The authentication process according to the present exemplary embodiment also ends at this time point.

On the other hand, when the APP_ID 212 has been found (verification has succeeded) as a result of searching the application ID list 506, then, in the authentication server 100, a process of transmitting a request for client certificate to the smart device 200 is executed (Ph3-SV-S 103). In the smart device 200 having received this request, first, whether the smart device 200 already has the client certificate 214 is determined (Ph3-SD-S 102). As a result, when the smart device 200 does not have the client certificate 214 (NO in Ph3-SD-S102), a process of creating a user account is executed (Ph3-SD-S103). This process is the same as the account creation process executed in the third phase process in the first exemplary embodiment. Thus, detailed description thereof is omitted.

On the other hand, when the smart device 200 already has the client certificate 214 (YES in Ph3-SD-S102), the above account creation process is not executed.

Next, in the smart device 200, a process of returning the client certificate 214 to the authentication server 100 is executed (Ph3-SD-S104). Subsequently, in the authentication server 100, a process of verifying the client certificate 214 is executed (Ph3-SV-S104). For this verification process, the same process as the client certificate verification process in the third phase process according to the first exemplary embodiment is performed. When verification of the client certificate succeeded, the process is advanced to the fourth phase.

Figure 25:
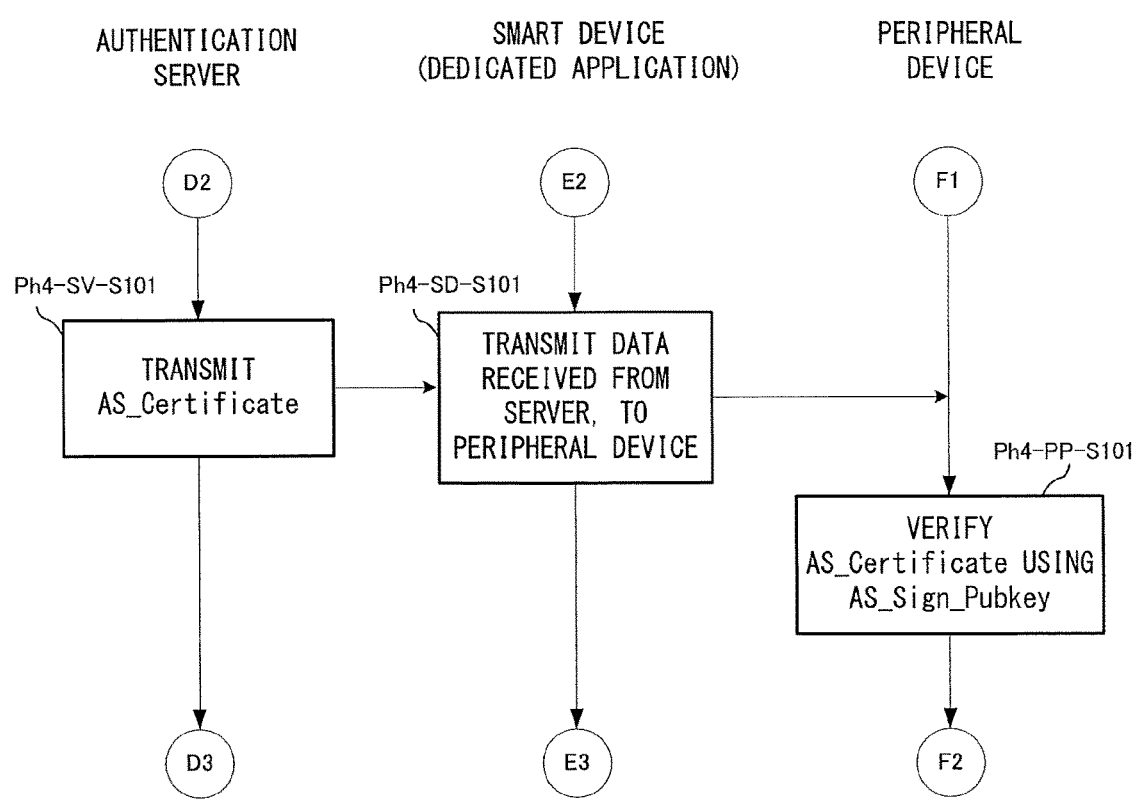
FIG. 25 is a flow chart showing details of a fourth phase process in the second exemplary embodiment.

Next, details of the fourth phase process will be described. In this phase, a process of verifying the authentication server 100 on the peripheral device 400 side is executed. FIG. 25 is a flow chart showing the details of the fourth phase process in the second exemplary embodiment. First, in the authentication server 100, a process is executed in which the AS_Certificate 503 (authentication server certificate) is read out from the storage section 102 to be transmitted to the smart device 200. Next, in the smart device 200, a process is executed in which the AS_Certificate 503 received from the authentication server 100 is transmitted to the peripheral device 400 (Ph4-SD-S 101). That is, the AS_Certificate 503 is transmitted from the authentication server 100 to the peripheral device 400, via the smart device 200.

Next, in the peripheral device 400, a process is executed in which the AS_Certificate 503 received from the smart device 200 is verified with the AS_Sign_Pubkey 601 stored in the secure memory 405. Specifically, a process of verifying the signature of the AS_Certificate 503, i.e., the Signature 505 is executed. As a result, when the verification has failed, a predetermined process assuming a verification failure case is executed, and the authentication process according to the second exemplary embodiment also ends at this time point. On the other hand, when verification has succeeded, the process is advanced to fifth phase.

Figure 26:
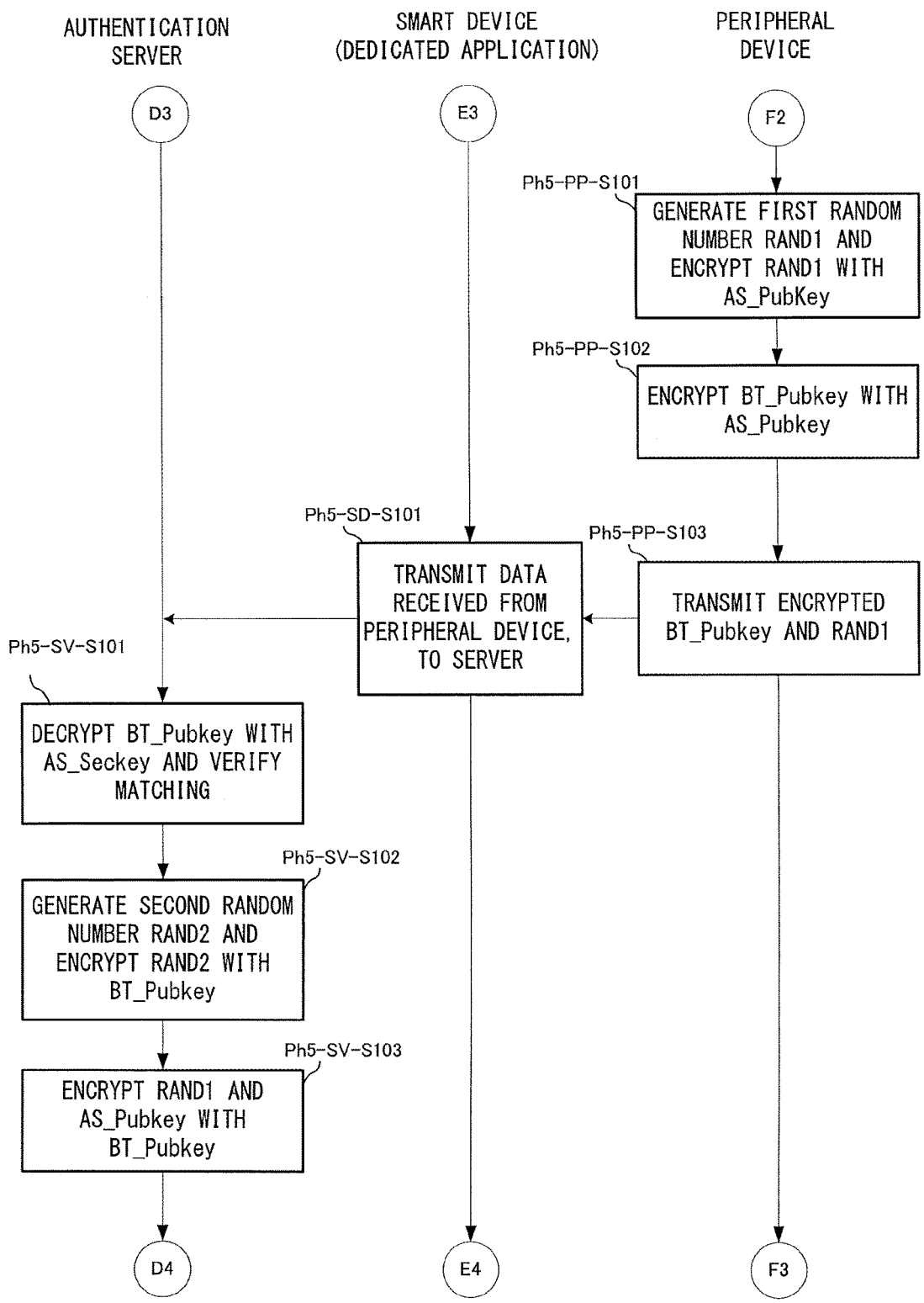
FIG. 26 is a flow chart showing details of a fifth phase process in the second exemplary embodiment.
Figure 27:
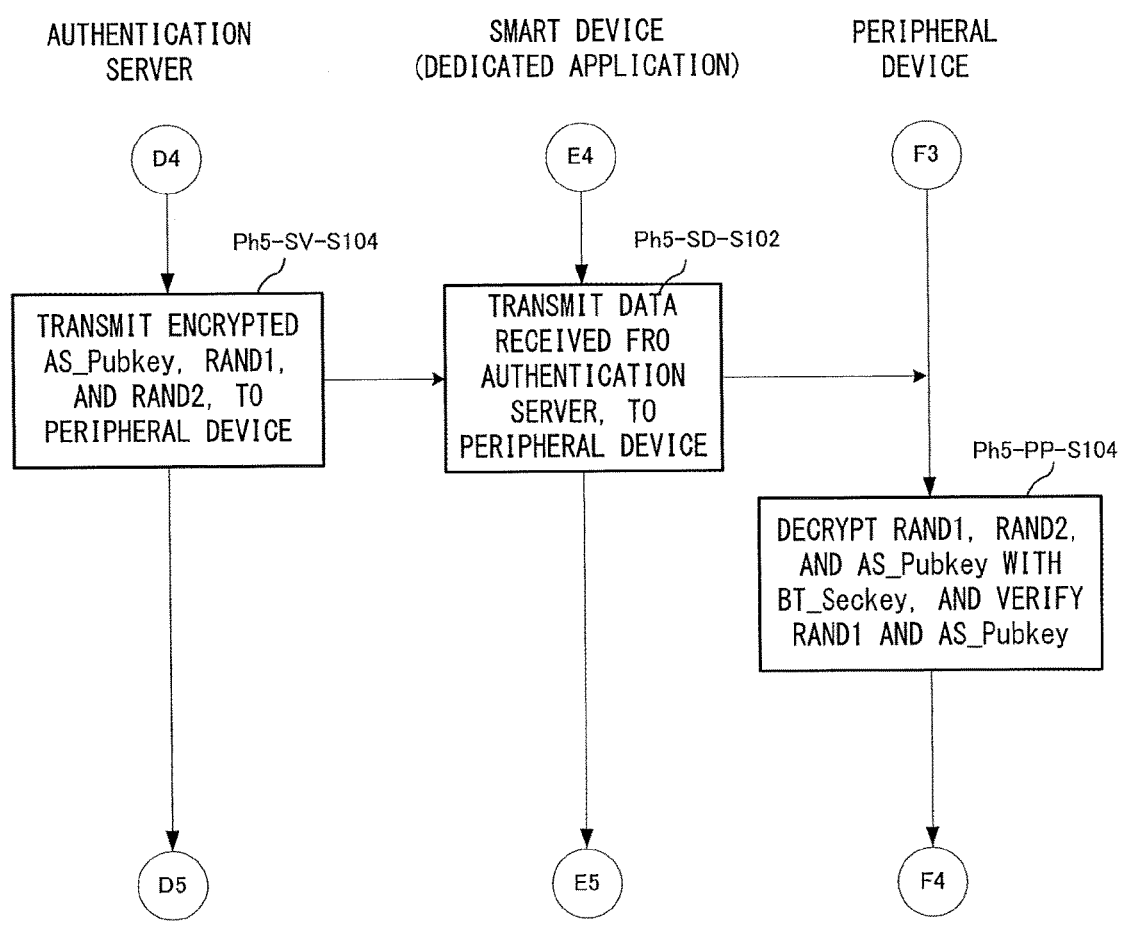
FIG. 27 is a flow chart showing details of the fifth phase process in the second exemplary embodiment.

Next, details of the fifth phase process will be described. FIG. 26 and FIG. 27 are flow charts showing the details of the fifth phase process in the second exemplary embodiment. In FIG. 26 and FIG. 27, the left flow indicates the flow of the process performed on the authentication server 100, the center flow indicates the flow of the process performed on the smart device (dedicated application) side, and the right flow indicates the flow of the process performed on the peripheral device 400 side. In this phase, mainly, a process is executed in which the first random number RAND1 and the second random number RAND2 are exchanged, between the authentication server 100 and the peripheral device 400. These random numbers are also data for creating a common key to be used in encrypted communication between the dedicated application and the peripheral device 400. In other words, these random numbers are data serving as the "seed" for the common key.

First, in the peripheral device 400, a first random number RAND1 is generated. Then, a process is executed in which the first random number RAND1 is encrypted with the AS_Pubkey 504 contained in the received AS_Certificate 503 (Ph5-PP-S101).

Next, in the peripheral device 400, a process is executed in which the BT_Pubkey 604 contained in the BT_Certificate 603 is encrypted with the AS_Pubkey 504 (Ph5-PP-S 102). For this AS_Pubkey 504, the one that is contained in the AS_Certificate 503 sent from the authentication server 100 in the fourth phase process is used.

Next, in the peripheral device 400, a process is executed in which the encrypted first random number RAND1 and the encrypted BT_Pubkey 604 are transmitted to the smart device 200 (Ph5-PP-S 103). In the smart device 200, a process of transmitting these to the authentication server 100 is executed (Ph5-SD-S101). That is, the encrypted first random number RAND1 and the encrypted BT_Pubkey 604 are transmitted from the peripheral device 400 to the authentication server 100 via the smart device 200.

Next, in the authentication server 100, a process of verifying the received BT_Pubkey 604 is executed (Ph5-SV-S101). Specifically, the received BT_Pubkey 604 is decrypted with the AS_Seckey 502. Then, a process is executed in which it is determined whether the decrypted BT_Pubkey 604 matches the BT_Pubkey 604 (see Ph2-SV-S101 above) obtained from the peripheral device 400 in the second phase process. When they match each other, it means that the verification has succeeded, and when they do not match each other, it means that the verification has failed. As a result of the verification, when the verification has failed, a predetermined process assuming a verification failure case is executed, and the authentication process according to the present exemplary embodiment also ends at this time point.

On the other hand, when the verification has succeeded, then, in the authentication server 100, a second random number RAND2 is generated. Then, a process is executed in which the second random number RAND2 is encrypted by use of the BT_Pubkey 604 (either the BT_Pubkey 604 obtained in the second phase process, or the BT_Pubkey 604 with respect of which the verification has succeeded may be used) (Ph5-SV-S 102).

Next, in the authentication server 100, a process is executed in which the received first random number RAND1 and the AS_Pubkey 504 stored in the storage section are encrypted with the BT_Pubkey 604 as in the above (Ph5-SV-S 103).

Next, in the authentication server 100, a process is executed in which the AS_Pubkey 504, the first random number RAND1, and the second random number RAND2 which have been encrypted are transmitted to the smart device 200 (Ph5-SV-S104). In the smart device 200, a process of transmitting these to the peripheral device 400 is executed (Ph5-SD-S102).

Next, in the peripheral device 400, a process is executed in which each piece of encrypted data sent from the authentication server 100 via the smart device 200 is decrypted with the BT_Seckey 602. Further, a process is executed in which the first random number RAND1 and the AS_Pubkey 504 which have been decrypted are verified (Ph5-PP-S 104). That is, the verification is executed by determining whether the first random number RAND1 and the AS_Pubkey 504 which have been sent from the authentication server 100 match those transmitted by the peripheral device 400 itself. When this verification has failed, a predetermined process assuming a verification failure case is executed. When the verification has succeeded, the process is advanced to the sixth phase process.

It should be noted that, in the fifth phase process, the reason why the BT_Pubkey 604 is transmitted from the peripheral device to the authentication server 100 is that the BT_Pubkey 604 serves as, so to speak, "source certificate". That is, the BT_Pubkey 604 is information that only the peripheral device 400 knows, and is stored in the secure memory 405, and thus, the possibility of modification thereof, etc. is low. Therefore, it can be said that the reliability of the BT_Pubkey 604 as a certificate of the source is very high. In other words, verification in the authentication server 100 is performed by using information that is stored in the secure memory 405 and that can identify the peripheral device. Thus, in another exemplary embodiment, instead of the BT_Pubkey 604, the entirety of the BT_Certificate 603 may be used, for example.

In another exemplary embodiment, in the fifth phase process, the first random number RAND1 may be generated at the authentication server 100, instead of being generated in the peripheral device 400. For example, a configuration may be employed in which: in the process of Ph5-SV-S102 above, both the first random number RAND1 and the second random number RAND2 are generated in the authentication server 100, and these are encrypted with the BT_Pubkey 604, to be transmitted to the peripheral device 400.

Figure 28:
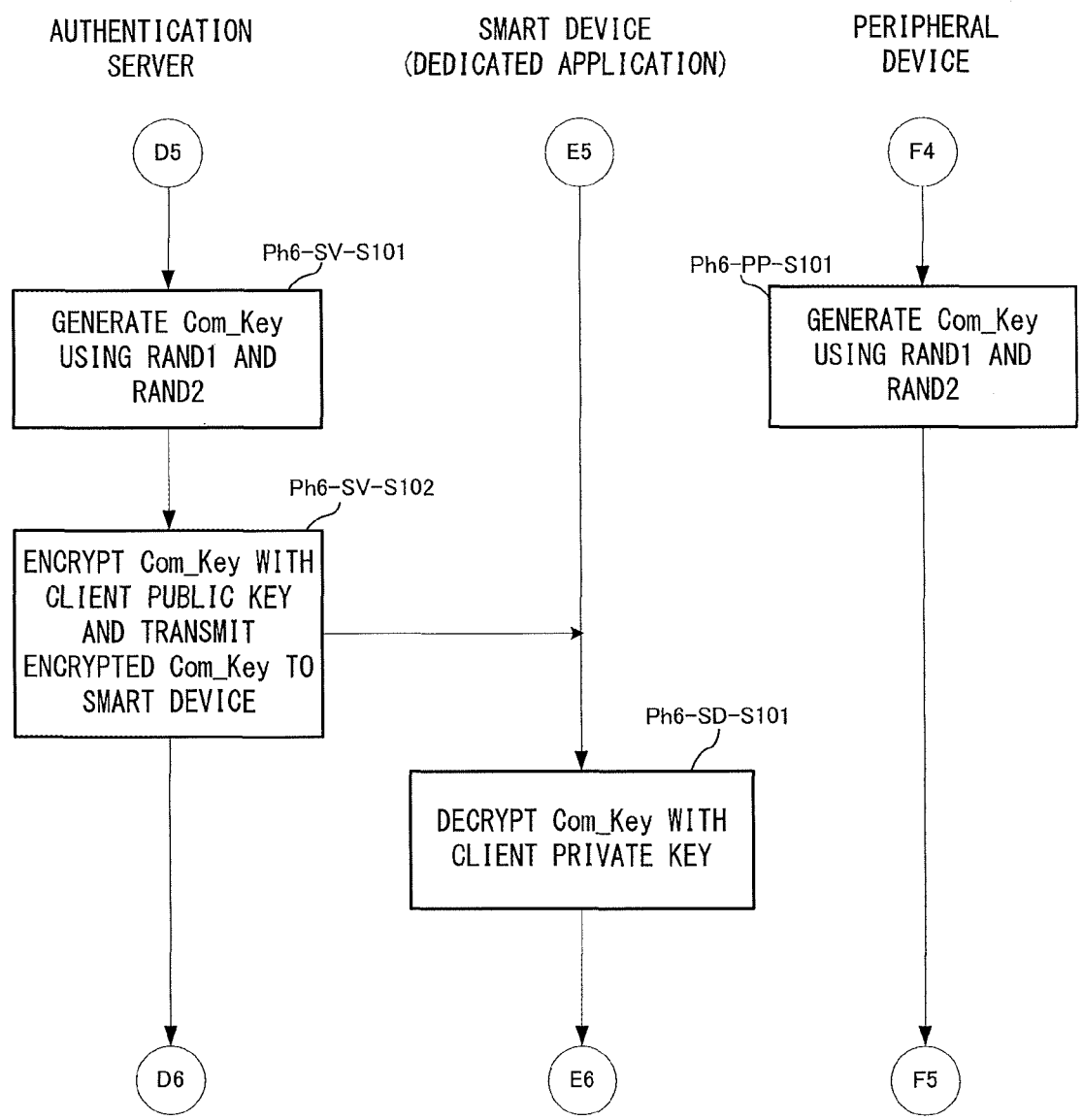
FIG. 28 is a flow chart showing details of a sixth phase process in the second exemplary embodiment.

Next, details of the sixth phase process will be described. In this phase, a process is executed in which a common key Com_key to be used in encrypted communication between the smart device 200 and the peripheral device 400 is prepared (generated). FIG. 28 is a flow chart showing the details of the sixth phase process in the second exemplary embodiment. In FIG. 28, the left flow indicates the flow of the process performed on the authentication server 100 side, the center flow indicates the flow of the process performed on the smart device (dedicated application) side, and the right flow indicates the flow of the process performed on the peripheral device 400 side.

First, in the authentication server 100, a process is executed in which a common key Com_key is generated by use of the first random number RAND1 and the second random number RAND2 (Ph6-SV-S101). Next, in the authentication server 100, a process of encrypting the common key Com_key with a client public key is executed. For this client public key, the one that is contained in the client certificate is used. Then, a process of transmitting the encrypted common key Com_key to the smart device 200 is executed (Ph6-SV-S102).

In the smart device 200, a process is executed in which the received common key Com_key is decrypted by use of a client private key (which is contained in the client certificate) of the smart device 200 itself (Ph6-SD-S101). Further, a process of storing the decrypted common key Com_key into the storage section 204 is also executed. This means that the smart device 200 has obtained a common key that is necessary in encrypted communication with the peripheral device 400.

On the other hand, in the peripheral device 400, a process is executed in which a common key Com_key is generated by use of the first random number RAND1 and the second random number RAND2 (Ph6-PP-S101). These random numbers are the same as those used in the authentication server 100, and thus, consequently, a common key Com_key that is the same as the common key Com_key generated in the authentication server 100 is generated. Then, the sixth phase process ends.

Figure 29:
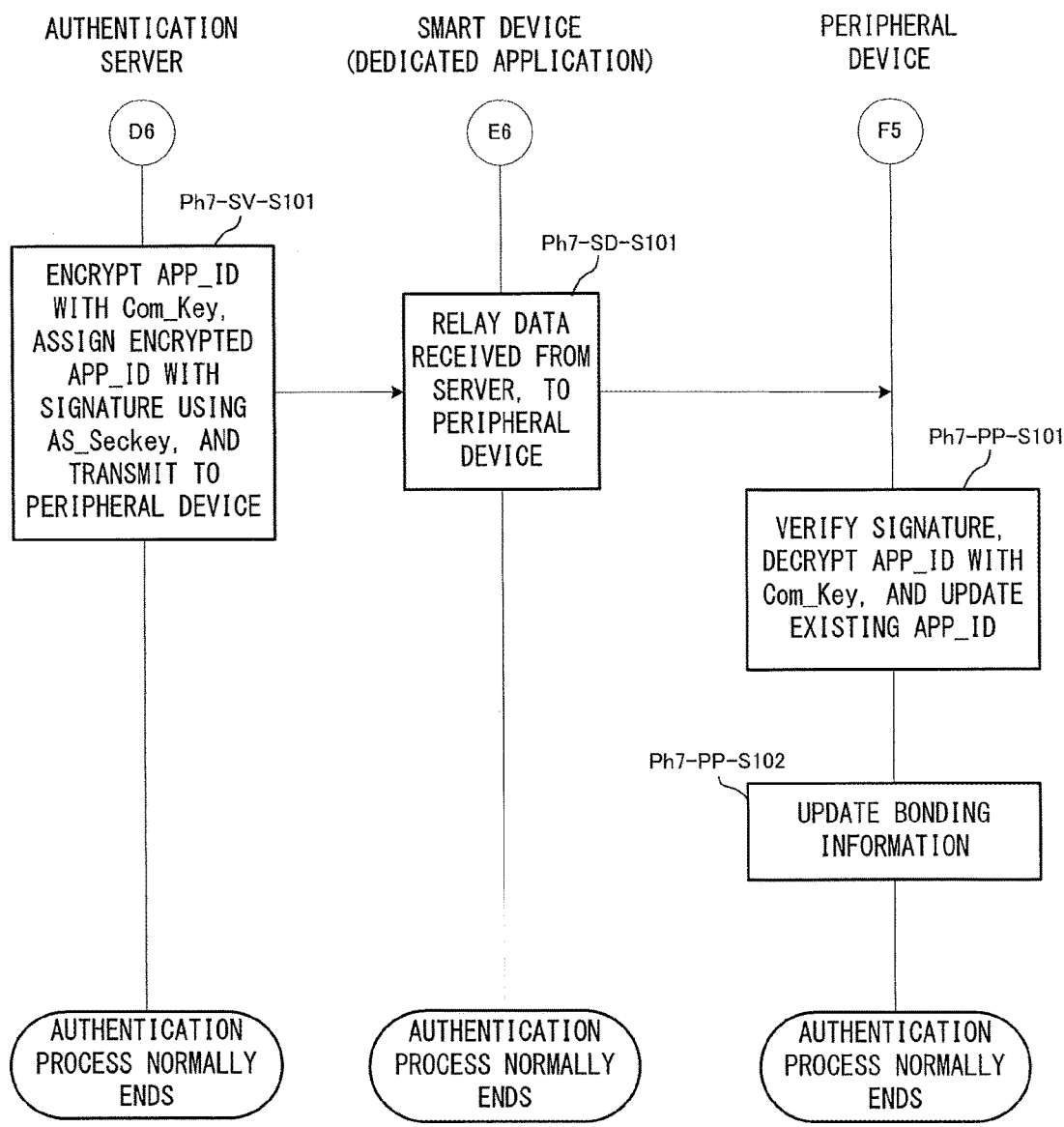
FIG. 29 is a flow chart showing details of a seventh phase process in the second exemplary embodiment.

Next, details of the seventh phase process will be described. In this phase, mainly, a setting process and the like are executed so as to allow the authentication process of the next time and thereafter to be skipped. FIG. 29 is a flow chart showing the details of the seventh phase process in the second exemplary embodiment. First, in the authentication server 100, a process is executed in which the APP_ID obtained from the smart device 200 in the third process is encrypted with the common key Com_key, and assigned with a signature by use of the AS_Seckey 502. Then, a process of transmitting the encrypted APP_ID to the smart device 200 is executed (Ph7-SV-S101). In the smart device 200, a process of transmitting the received data to the peripheral device 400 is executed (Ph7-SD-S101).

Next, in the peripheral device 400, a process is executed in which the encrypted common key Com_key sent from the authentication server 100 via the smart device 200 is received. Further, a process of verifying the signature is executed. When the verification succeeds, a process of decrypting the encrypted APP_ID with the common key Com_key is executed. Then, a process of updating the existing APP_ID 704 with (or newly storing) the obtained APP_ID is executed (Ph7-PP-S 101).

Next, in the peripheral device 400, a process of updating the bonding information 701 is executed (Ph7-SV-S 102). This process is the same as the updating process of the bonding information in the fifth phase process according to the first exemplary embodiment. Here, detailed description thereof is omitted.

Thus, the authentication process according to the second exemplary embodiment normally ends. After this, with respect the communication between the dedicated application and the peripheral device 400, encryption is to be performed using the common key Com_key. Further, as in the first exemplary embodiment, encryption based on the Bluetooth standard is also performed. That is, communication between the parties is to be performed in the double encryption.

As described above, the second exemplary embodiment employs a configuration in which the peripheral device 400 has the secure memory 405. Then, in this secure memory 405, data of keys and certificate are stored. In other words, information to be used in generation of the common key Com_key is stored in the secure memory 405. With this configuration, compared with the first exemplary embodiment, the running cost of authentication server can be reduced. For example, in the first exemplary embodiment, for operation of the authentication server 100, update of the database 113 (especially, BT_Addr) is necessary. However, in the second exemplary embodiment, this updating work is not necessary. In addition, costs in manufacturing steps of the peripheral device can also be reduced. For example, in the first exemplary embodiment, a step of writing a signature (BT_Sign) is necessary in the manufacturing step of the peripheral device. However, in the second exemplary embodiment, this step is not necessary.

In the present exemplary embodiments described above, an exemplary configuration has been described in which communication between the authentication server 100 and the peripheral device 300 (in the second exemplary embodiment, the peripheral device 400) is relayed by the smart device 200. However, in another exemplary embodiment, the peripheral device 300 and the authentication server 100 may communicate with each other to perform the authentication process, not via the smart device 200. For example, the following configuration may be employed. For example, the peripheral device 300 is provided with a wireless LAN function and is configured to be communicable with authentication server 100. For example, predetermined settings, such as the address of the server, for connecting to the authentication server 100 are previously stored in the non-volatile memory 303. In addition, the peripheral device is further provided with a simple user interface (a small liquid crystal screen, several operation buttons, and the like). The user operates the user interface of the peripheral device 300 to perform a predetermined setting operation, such as connecting to a predetermined access point provided in the user's house. Then, at the initial activation of the peripheral device 300, communication with the authentication server 100 is performed not via the smart device 200, thereby performing the authentication process (this configuration could be said as a configuration in which communication is performed via a communication device called an access point). In other words, the authentication process is performed prior to establishing connection to the smart device (dedicated application), and then, the APP_ID 317 is caused to be stored in the peripheral device 300. In such a case, for example, the database in the authentication server 100 is configured to have a table using the BT_Addr 115 as a main key (corresponding to a so-called white list). From the peripheral device 300, the BT_Key 318, the BT_Addr 311, the BT_Sign 312, and the first random number RAND1 are encrypted and transmitted to the authentication server 100 (not via the smart device). In the authentication server 100, verification based on these pieces of data is performed. When authenticity of the peripheral device 300 has been confirmed, an APP_ID is eventually transmitted from the authentication server 100 to the peripheral device 300. Then, in the peripheral device 300 having received this APP_ID, update of the APP_ID 317 and update of the bonding information 314 are performed.

The timing at which the authentication process is executed is not limited to the timing of the initial activation of the peripheral device 300. For example, by using activation of the dedicated application as a trigger, the authentication process may be executed between the peripheral device 300 and the authentication server 100. Alternatively, a configuration may be employed in which: when a connection request is issued from the dedicated application to the peripheral device, the presence/absence and the valid period of the bonding information is checked at the peripheral device 300; and then, when the authentication process is necessary, an authentication process not via the smart device 200 is executed between the peripheral device 300 and the authentication server 100.

With respect to the determination of the valid period, in the above exemplary embodiments, an example has been shown in which the valid period is counted down for each day by using the valid period counter 320. Other than this, for example, the following configuration may be employed. That is, at the timing when the bonding information 314 has been updated, a predetermined value (for example, 100) is set to a predetermined counter, and every time the peripheral device 300 and the smart device 200 are connected to each other, the value of the counter is reduced by one (i.e., the number of times of connections is counted). Then, at the time of connection made between the peripheral device 300 and the smart device 200, it is determined whether the value of the counter is 0. When the value of the counter is 0, execution of the authentication process as described above is requested. Such a counter can be considered as information that indicates the valid period.

With respect to the timing at which to execute the authentication process, the following configuration may be employed. For example, if the smart device is in on-line connection to the Internet (i.e., in a state of being communicable with the authentication server), every time the peripheral device is connected to the smart device, the authentication process using the authentication server is executed. Alternatively, the following configuration may be employed. For example, in a case where the dedicated application is configured to save data, when the saved data is deleted, execution of the authentication process using the authentication server (when connected to the peripheral device thereafter) is required.

Furthermore, a configuration may be employed in which: the peripheral device 300 is configured to be able to be connected to a mobile telephone network and to perform communication with the authentication server 100 not via the smart device 200 as described above. In this case, it is not necessary for the user to perform aforementioned connection setting work to an access point of the user's house.

As mentioned above, in another exemplary embodiment, with respect to the application table 114 stored in the authentication server 100, a configuration may be employed in which, for one BT_Addr, user IDs/passwords can be registered for a plurality of persons. In such a case, the following control may be performed. That is, in the authentication server 100, it is determined whether the number of the user IDs 116 registered for one (the same) BT_Addr 115 exceeds a predetermined number. As a result, when the number of the user IDs 116 exceeds the predetermined number, control may be performed such that use of the peripheral devices 300 that correspond to the BT_Addr 115 is not permitted. For example, even if a request for authentication is received from a peripheral device 300 having the BT_Addr 115, the authentication process is not performed. For example, in a case where an unnaturally large number of user IDs are registered to one BT_Addr 115, there is a possibility that the BT_Addr 311, the BT_Sign 312, and the Pub_Key 313 have been illegally copied (i.e., peripheral devices that are no genuine products exist). However, with this configuration, it is possible to prevent increase of damage caused in such a case.

In the example described above, an example has been shown in which the number of APP_ID stored in the peripheral device 300 is one. However, not limited to this example, in another exemplary embodiment, a plurality of APP_IDs may be stored in the peripheral device 300. For example, it is assumed that there are three types of dedicated applications that correspond to the peripheral device 300, i.e., a dedicated application A, a dedicated application B, and a dedicated application C. In such a case, a configuration may be employed in which, using the initial activations of the respective applications as triggers, the authentication process is executed for the respective applications, and as a result, three different APP_IDs are stored in the peripheral device. Then, in the first phase process, on the peripheral device 300 side, it is determined whether the APP_ID transmitted from the dedicated application matches any one of the plurality of APP_IDs stored in the peripheral device 300 itself.

In the examples described above, the dedicated application is executed on the smart device such as a smartphone, and the peripheral device 300 is used via the dedicated application. In another exemplary embodiment, this smart device may be a communication device such as a personal computer. Further, for example, the smart device may be a communication device in the form of a household electric appliance provided with a communication function.

(Additional Note)

From the exemplary embodiments specifically explained above, the following configurations can be extracted.

A. A computer-readable non-transitory storage medium having stored therein an application program to be executed by a computer of a predetermined communication device that uses a predetermined peripheral device communicably connected thereto, the application program causing the computer to perform operations comprising:

receiving a transmission request for an application ID from the peripheral device;

transmitting the application ID of the application program that has been activated, to the peripheral device in response to the transmission request; and executing a predetermined process involving a communication process with the peripheral device when verification of the application ID in the peripheral device has succeeded.

B. A computer-readable non-transitory storage medium having stored therein an application program to be executed by a computer of a predetermined communication device communicably connected to a predetermined server, the application program causing the computer to perform operations comprising:

receiving a transmission request for an application ID from the server;

transmitting the application ID of the application program that has been activated, to the server in response to the transmission request; and executing a predetermined process involving a communication process with a predetermined peripheral device, wherein when verification of the application ID in the server has succeeded after the application ID had been transmitted, execution of the predetermined process involving the communication process with the predetermined peripheral device is permitted.

C. The computer-readable non-transitory storage medium having stored therein the application program according to A. above wherein the application ID is an ID inherent to each application program.

D. A computer-readable non-transitory storage medium having stored therein an application program to be executed by a computer of a predetermined communication device communicably connect to a predetermined server, the application program causing the computer to perform operations comprising:

receiving a transmission request for a client certificate from the server;

transmitting the client certificate stored in a storage section of the predetermined communication device, to the server in response to the transmission request; and executing a predetermined process involving a communication process with a predetermined peripheral device, wherein when verification of authenticity of the client certificate in the server has succeeded after the client certificate had been transmitted, execution of the predetermined process involving the communication process with the predetermined peripheral device is permitted.

What is claimed is:

1. A peripheral device capable of performing data communication with an authentication service via a predetermined intermediary communication device, the peripheral device comprising a processor and a communications interface connected to the processor, the processor and communications interface configured to:

transmit, to the authentication server, an encryption key for encrypted communication, identification information which is information capable of uniquely identifying the peripheral device, and signature information which is a digital signature of the identification information;

receive, from the authentication server, first data which is data based on a result of an authentication process executed in the authentication server on the basis of the identification information and the signature information transmitted by the first communication section, then, encrypt, with the encryption key, request information indicating a transmission request for second data, and transmit the encrypted request information to the authentication server;

receive the second data encrypted and transmitted from the authentication server in response to the request information transmitted by the second communication section, then, decrypt the encrypted second data by use of the encryption key, and transmit the decrypted second data to the authentication server; and receive, from the authentication server, third data which is data based on a result indicating that authenticity of the second data transmitted by the third communication section has been confirmed in the authentication server, and then execute a communication process using fourth data encrypted with the encryption key, between the peripheral device and the predetermined communication device, wherein the processor and communications interface are configured to use the same encryption key to (a) encrypt the request information indicating a transmission request for second data, (b) decrypt the encrypted second data and (c) use the encrypted fourth data.

2. The peripheral device according to claim 1, wherein a random number is used as the second data.

3. The peripheral device according to claim 1, further comprising:

a storage configured to set a valid period of bonding information and then store the bonding information in the storage, the bonding information being information to be used when the peripheral device is to be reconnected to the predetermined communication device to which the peripheral device has been connected once; and a valid period determination logic configured to determine whether the valid period has elapsed, before communication of the peripheral device with the predetermined communication device is started, wherein when the valid period determination logic has determined that the valid period has elapsed, the processor and the communications interface again perform the transmit and receive operations.

4. The peripheral device according to claim 1, wherein the peripheral device performs the communication with the predetermined intermediary communication device in the form of Bluetooth (registered trademark) communication and the encryption key comprises a Bluetooth key.

5. An information processing method for controlling a peripheral device capable of performing data communication with an authentication server via a predetermined intermediate communication device, the information processing method comprising:

transmitting, to an authentication server, an encryption key for encrypted communication, identification information which is information capable of uniquely identifying the peripheral device, and signature information which is a digital signature of the identification information;

receiving, from the authentication server, first data which is data based on a result of an authentication process executed in the authentication server on the basis of the identification information and the signature information that have been transmitted, then, encrypting, with the encryption key, request information indicating a transmission request for second data, and transmitting the encrypted request information to the authentication server;

receiving the second data encrypted and transmitted from the authentication server in response to the transmitted request information, then, decrypting the encrypted second data by use of the encryption key, and transmitting the decrypted second data to the authentication server; and receiving, from the authentication server, third data which is data based on a result indicating that authenticity of the transmitted second data has been confirmed in the authentication server, and then, executing a communication process using fourth data encrypted with the encryption key, between the peripheral device and the predetermined communication device, wherein the same encryption key is used to (a) encrypt the request information indicating a transmission request for second data, (b) decrypt the encrypted second data and (c) use the encrypted fourth data.

* * * * *